(12) United States Patent
Uno

(10) Patent No.: US 12,097,883 B2
(45) Date of Patent: Sep. 24, 2024

(54) INFORMATION PROCESSING SERVER, PROCESSING METHOD OF INFORMATION PROCESSING SERVER, AND STORAGE MEDIUM

(71) Applicant: TOYOTA JIDOSHA KABUSHIKI KAISHA, Toyota (JP)

(72) Inventor: Satoshi Uno, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 260 days.

(21) Appl. No.: 17/825,432

(22) Filed: May 26, 2022

(65) Prior Publication Data

US 2022/0388542 A1    Dec. 8, 2022

(30) Foreign Application Priority Data

Jun. 4, 2021 (JP) ................................. 2021-094347

(51) Int. Cl.
*B60W 60/00* (2020.01)
*B60W 40/09* (2012.01)

(52) U.S. Cl.
CPC ........ *B60W 60/0016* (2020.02); *B60W 40/09* (2013.01); *B60W 60/0017* (2020.02);
(Continued)

(58) Field of Classification Search
CPC ......... B60W 60/0016; B60W 60/0017; B60W 40/09; B60W 2554/4041;
(Continued)

(56) References Cited

U.S. PATENT DOCUMENTS 10,997,429 B2 *   5/2021   Golov .................... G07C 5/008
11,009,876 B2 *   5/2021   Bielby ................. G05D 1/0088
(Continued)

FOREIGN PATENT DOCUMENTS

CN    110155066 A    8/2019
CN    110949375 A    4/2020
(Continued)

OTHER PUBLICATIONS

Denrie Enriquez Jr, Sean Jenson, Alex Bautista, Paloma Hawn, Sun-Il Kim, Muhammad Ali, Jeffrey Miller, "On Software-based Remote Vehicle Monitoring for Detection and Mapping of Slippery Road Sections", CrossMark, J. ITS Res. (2017), 15:141-154 (published online Jul. 22, 2016); Springer Science+Business Media New York 2016.

(Continued)

*Primary Examiner* — Angelina M Shudy
(74) *Attorney, Agent, or Firm* — Dinsmore & Shohl LLP

(57) ABSTRACT

An information processing server includes a target vehicle data recognition unit configured to recognize target vehicle data including a traveling state of a target vehicle and position information of the target vehicle on a map, an unstable behavior position recognition unit configured to recognize an unstable behavior position which is a position on the map, at which at least one target vehicle has performed an unstable behavior, based on a plurality of pieces of the target vehicle data, a determination unit configured to determine whether the unstable behavior position is in a continuous occurrence situation or a discontinuous situation, based on whether or not a plurality of the target vehicles perform the unstable behavior at the unstable behavior position, and a storage processing unit configured to store a determination result by the determination unit, in a storage database in association with the unstable behavior position.

8 Claims, 9 Drawing Sheets

(52) U.S. Cl.
CPC . *B60W 2540/30* (2013.01); *B60W 2554/4041* (2020.02); *B60W 2554/4049* (2020.02)

(58) Field of Classification Search
CPC ...... B60W 2554/4049; B60W 2540/30; G08G 1/0129; G08G 1/0141; G08G 1/048; G08G 1/096716; G08G 1/096725; G08G 1/096741; G08G 1/096775; G08G 1/0112; G08G 1/096708; G08G 1/096791; G08G 1/0969; G05D 1/00
See application file for complete search history.

(56) References Cited

U.S. PATENT DOCUMENTS

| | | | | |
|---|---|---|---|---|
| 11,161,518 | B2* | 11/2021 | Golov | G06V 20/56 |
| 11,217,045 | B2* | 1/2022 | Uno | B60W 40/09 |
| 11,365,977 | B2* | 6/2022 | Takeuchi | G01C 21/3863 |
| 11,516,295 | B1* | 11/2022 | Nemmani | H04W 4/38 |
| 11,727,794 | B2* | 8/2023 | Bielby | G08G 1/017 |
| | | | | 701/119 |
| 11,899,697 | B2* | 2/2024 | Uno | G01C 21/3691 |
| 2003/0046021 | A1* | 3/2003 | Lasky | G05D 1/0261 |
| | | | | 702/150 |
| 2005/0065711 | A1 | 3/2005 | Dahlgren | |
| 2009/0072958 | A1* | 3/2009 | Hammerschmidt | |
| | | | | B60C 23/0408 |
| | | | | 340/447 |
| 2009/0319139 | A1* | 12/2009 | Kondou | B60W 10/184 |
| | | | | 701/55 |
| 2010/0217486 | A1* | 8/2010 | Taguchi | B60T 7/22 |
| | | | | 701/41 |
| 2012/0022782 | A1 | 1/2012 | Laube et al. | |
| 2012/0083964 | A1* | 4/2012 | Montemerlo | B60T 8/885 |
| | | | | 701/25 |
| 2016/0042644 | A1* | 2/2016 | Velusamy | G08G 1/096775 |
| | | | | 340/435 |
| 2016/0133131 | A1* | 5/2016 | Grimm | G08G 1/0141 |
| | | | | 701/117 |
| 2016/0280224 | A1 | 9/2016 | Tatourian et al. | |
| 2016/0288707 | A1* | 10/2016 | Matsumura | B60W 50/14 |
| 2017/0132334 | A1* | 5/2017 | Levinson | B60W 50/00 |
| 2017/0183015 | A1* | 6/2017 | Phelan | G07C 5/02 |
| 2017/0263121 | A1* | 9/2017 | Ono | G08G 1/096716 |
| 2017/0278391 | A1* | 9/2017 | Ono | G08G 1/0129 |
| 2018/0012490 | A1* | 1/2018 | Jodorkovsky | G08G 1/096725 |
| 2018/0047285 | A1* | 2/2018 | Johnson | G08G 1/165 |
| 2018/0068497 | A1* | 3/2018 | Kurtz | G07C 5/0808 |
| 2018/0173224 | A1* | 6/2018 | Kim | G05D 1/0061 |
| 2018/0211520 | A1 | 7/2018 | Offenhaeuser | |
| 2018/0281788 | A1* | 10/2018 | Uchida | B60W 30/0956 |
| 2018/0286222 | A1* | 10/2018 | Urano | G08G 1/015 |
| 2019/0061783 | A1* | 2/2019 | Jin | G08G 1/0112 |
| 2019/0130742 | A1 | 5/2019 | Tokunaga et al. | |
| 2019/0294167 | A1* | 9/2019 | Kutila | G08G 1/091 |
| 2019/0315350 | A1* | 10/2019 | Oguro | B60W 30/0956 |
| 2019/0316913 | A1* | 10/2019 | Golov | G06V 20/58 |
| 2019/0382029 | A1* | 12/2019 | Golov | G06V 10/82 |
| 2020/0098203 | A1* | 3/2020 | Uno | G08G 1/0112 |
| 2020/0298886 | A1* | 9/2020 | Umeda | H04W 4/44 |
| 2020/0302789 | A1* | 9/2020 | Oyama | G01C 21/3407 |
| 2020/0307551 | A1* | 10/2020 | Horiguchi | B60W 30/02 |
| 2020/0392916 | A1* | 12/2020 | Hellstrom | F02D 41/1495 |
| 2021/0039673 | A1* | 2/2021 | Oyama | G08G 1/162 |
| 2021/0354688 | A1* | 11/2021 | Tashiro | B62D 15/0285 |
| 2022/0126878 | A1* | 4/2022 | Moustafa | G08G 1/0112 |
| 2022/0332307 | A1* | 10/2022 | McClain | B60D 1/30 |
| 2023/0085098 | A1* | 3/2023 | Staats | G08G 1/096791 |
| | | | | 701/117 |
| 2023/0118619 | A1* | 4/2023 | Horihata | G06T 7/70 |
| | | | | 340/937 |
| 2023/0120095 | A1 | 4/2023 | Horihata | |
| 2023/0278584 | A1* | 9/2023 | Pyun | G01C 21/3658 |
| 2023/0406325 | A1* | 12/2023 | Beaurepaire | B60W 40/04 |
| 2024/0034362 | A1* | 2/2024 | Oba | B60W 50/14 |
| 2024/0043044 | A1* | 2/2024 | Mikuni | B60W 50/14 |
| 2024/0144829 | A1* | 5/2024 | Kim | G08G 1/167 |

FOREIGN PATENT DOCUMENTS

| | | |
|---|---|---|
| EP | 3441724 A1 | 2/2019 |
| JP | 2013-544695 A | 12/2013 |
| JP | 2019-010900 A | 1/2019 |
| JP | 2019-111867 A | 7/2019 |
| JP | 2020-052607 A | 4/2020 |
| WO | 2012/047743 A2 | 4/2012 |
| WO | 2017187883 A1 | 11/2017 |

OTHER PUBLICATIONS

Inventor: Satoshi Uno, U.S. Appl. No. 17/804,190, filed May 31, 2022.

Inventor: Satoshi Uno, U.S. Appl. No. 17/742,783, filed May 12, 2022.

* cited by examiner

| FOLLOWING TARGET VEHICLE \ PRECEDING TARGET VEHICLE | UNSTABLE BEHAVIOR OCCURRING | NO UNSTABLE BEHAVIOR |
|---|---|---|
| UNSTABLE BEHAVIOR OCCURRING | SCENE 1 | SCENE 3 |
| NO UNSTABLE BEHAVIOR | SCENE 2 | SCENE 4 |

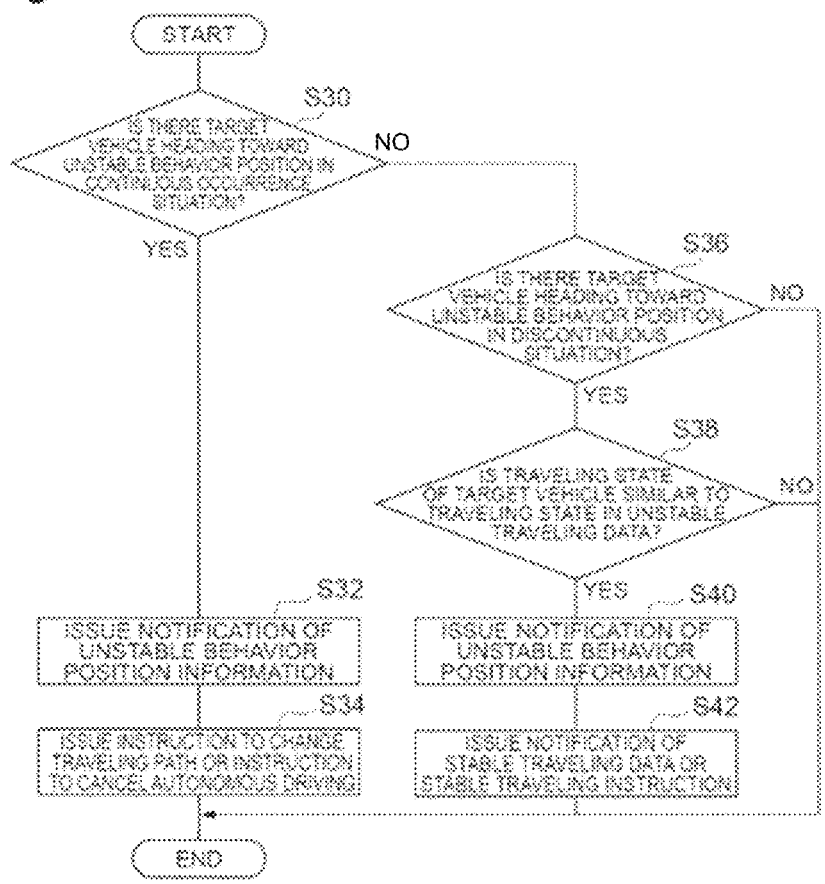

INFORMATION PROCESSING SERVER, PROCESSING METHOD OF INFORMATION PROCESSING SERVER, AND STORAGE MEDIUM

CROSS-REFERENCE TO RELATED APPLICATION

This application claims the benefit of priority from Japanese Patent Application No. 2021-094347, filed Jun. 4, 2021, the entire contents of which are incorporated herein by reference.

TECHNICAL FIELD

The present disclosure relates to an information processing server, a processing method of the information processing server, and a storage medium.

BACKGROUND

Regarding processing of information regarding traveling of a vehicle, for example, Japanese Unexamined Patent Publication No. 2013-544695 is known. This publication discloses processing of informing other surrounding vehicles of a zone in which the driver feels that the autonomous driving is not safe, in traveling of an autonomous driving vehicle.

SUMMARY

By the way, it is considered that position information when the vehicle performs an unstable behavior is collected as information regarding the traveling of the vehicle. However, the reproducibility of the unstable behavior of the vehicle varies, and it is not appropriate to normally and uniformly handle the position information in which the vehicle has performed the unstable behavior.

According to an aspect of the present disclosure, an information processing server includes a target vehicle data recognition unit configured to recognize target vehicle data including a traveling state of a target vehicle and position information of the target vehicle on a map, an unstable behavior position recognition unit configured to recognize an unstable behavior position which is a position on the map, at which at least one target vehicle has performed an unstable behavior, based on a plurality of pieces of the target vehicle data, a determination unit configured to determine whether the unstable behavior position is in a continuous occurrence situation or a discontinuous situation, based on whether or not a plurality of the target vehicles perform the unstable behavior at the unstable behavior position, and a storage processing unit configured to store a determination result of the determination unit, in a storage database in association with the unstable behavior position.

According to the information processing server according to the aspect of the present disclosure, the unstable behavior position at which the target vehicle has performed the unstable behavior is recognized from the target vehicle data, and it is determined whether the unstable behavior position is in the continuous occurrence situation or the discontinuous situation. In addition, a determination result is stored in the storage database in association with the unstable behavior information at the unstable behavior position. Thus, according to the information processing server, it is possible to store the unstable behavior position and the determination result of whether the unstable behavior position is in the continuous occurrence situation or the discontinuous situation, in association with each other.

The information processing server according to the aspect of the present disclosure may further include a vehicle support unit configured to, when there is the target vehicle heading toward the unstable behavior position, notify the target vehicle of unstable behavior position information being information regarding the unstable behavior position. The vehicle support unit may be configured to, when it is determined that the unstable behavior position is in the continuous occurrence situation, instruct the target vehicle to change a traveling path such that the target vehicle avoids the unstable behavior position.

The information processing server according to the aspect of the present disclosure may further include a vehicle support unit configured to, when there is the target vehicle heading toward the unstable behavior position, notify the target vehicle of unstable behavior position information being information regarding the unstable behavior position. The target vehicle may be an autonomous driving vehicle. The vehicle support unit may be configured to, when it is determined that the unstable behavior position is in the continuous occurrence situation, issue an instruction to cancel autonomous driving at the unstable behavior position along with the notification of the unstable behavior position information.

The information processing server according to the aspect of the present disclosure may further include a vehicle support unit configured to, when there is the target vehicle heading toward the unstable behavior position, notify the target vehicle of unstable behavior position information being information regarding the unstable behavior position. The vehicle support unit may be configured to issue the notification of the unstable behavior position information when it is determined that the unstable behavior position is in the continuous occurrence situation, and not issue the notification of the unstable behavior position information when the unstable behavior position is in the discontinuous situation.

The information processing server according to the aspect of the present disclosure may further include a traveling data acquisition unit configured to acquire unstable traveling data regarding the traveling state of the target vehicle in which the unstable behavior has occurred at the unstable behavior position determined to be in the discontinuous situation, and a similarity determination unit configured to, when there is the target vehicle heading toward the unstable behavior position determined to be in the discontinuous situation, determine whether or not the traveling state of the target vehicle is similar to a traveling state in the unstable traveling data. The vehicle support unit may be configured to, when the similarity determination unit determines that the traveling state of the target vehicle is similar to the traveling state in the unstable traveling data, notify the target vehicle of the unstable behavior position information of the unstable behavior position determined to be in the discontinuous situation.

The information processing server according to the aspect of the present disclosure may further include a traveling data acquisition unit configured to acquire stable traveling data regarding the traveling state of the target vehicle in which the unstable behavior has not occurred at the unstable behavior position determined to be in the discontinuous situation, and a vehicle support unit configured to, when there is the target vehicle heading toward the unstable behavior position determined to be in the discontinuous situation, notify the target vehicle of the stable traveling data and the unstable behavior position information being information regarding the unstable behavior position.

The information processing server according to the aspect of the present disclosure may further include a traveling data acquisition unit configured to acquire unstable traveling data regarding the traveling state of the target vehicle in which the unstable behavior has occurred at the unstable behavior position determined to be in the discontinuous situation, and stable traveling data regarding the traveling state of the target vehicle in which the unstable behavior has not occurred at the unstable behavior position determined to be in the discontinuous situation, and a similarity determination unit configured to, when there is the target vehicle heading toward the unstable behavior position determined to be in the discontinuous situation, determine whether or not the traveling state of the target vehicle is similar to the traveling state in the unstable traveling data. The vehicle support unit may be configured to, when the similarity determination unit determines that the traveling state of the target vehicle is similar to the traveling state in the unstable traveling data, notify the target vehicle of the unstable behavior position information of the unstable behavior position determined to be in the discontinuous situation and issue an instruction to bring the traveling state of the target vehicle close to the traveling state in the stable traveling data.

According to another aspect of the present disclosure, there is provided a processing method of an information processing server. The processing method includes recognizing target vehicle data including a traveling state of a target vehicle and position information of the target vehicle on a map, recognizing an unstable behavior position which is a position on the map, at which at least one target vehicle has performed an unstable behavior, based on a plurality of pieces of the target vehicle data, determining whether the unstable behavior position is in a continuous occurrence situation or a discontinuous situation, based on whether or not a plurality of the target vehicles perform the unstable behavior at the unstable behavior position, and storing a determination result in the step of determining, in a storage database in association with the unstable behavior position.

According to the processing method of the information processing server according to another aspect of the present disclosure, the unstable behavior position at which the target vehicle has performed the unstable behavior is recognized from the target vehicle data, and it is determined whether the unstable behavior position is in the continuous occurrence situation or the discontinuous situation. In addition, a determination result is stored in the storage database in association with the unstable behavior information at the unstable behavior position. Thus, according to the processing method, it is possible to store the unstable behavior position and the determination result of whether the unstable behavior position is in the continuous occurrence situation or the discontinuous situation, in association with each other.

According to still another aspect of the present disclosure, there is provided a non-transitory computer-readable storage media stored a program causing a computer to function as an information processing server. The information processing server comprising a target vehicle data recognition unit configured to recognize target vehicle data including a traveling state of a target vehicle and position information of the target vehicle on a map, an unstable behavior position recognition unit configured to recognize an unstable behavior position which is a position on the map, at which at least one target vehicle has performed an unstable behavior, based on a plurality of pieces of the target vehicle data, a determination unit configured to determine whether the unstable behavior position is in a continuous occurrence situation or a discontinuous situation, based on whether or not a plurality of the target vehicles perform the unstable behavior at the unstable behavior position, and a storage processing unit configured to store a determination result of the determination unit, in a storage database in association with the unstable behavior position.

According to the storage media according to still another aspect of the present disclosure, the unstable behavior position at which the target vehicle has performed the unstable behavior is recognized from the target vehicle data, and it is determined whether the unstable behavior position is in the continuous occurrence situation or the discontinuous situation. In addition, a determination result is stored in the storage database in association with the unstable behavior information at the unstable behavior position. Thus, according to the program, it is possible to store the unstable behavior position and the determination result of whether a situation of the unstable behavior position is in the continuous occurrence situation or the discontinuous situation, in association with each other.

According to each aspect of the present disclosure, it is possible to store the unstable behavior position and the determination result of whether the unstable behavior position is in the continuous occurrence situation or the discontinuous situation, in association with each other.

BRIEF DESCRIPTION OF THE DRAWINGS

FIG. 9 is a flowchart illustrating an example of a target vehicle support process.

DETAILED DESCRIPTION

Hereinafter, an embodiment of the present disclosure will be described with reference to the drawings.

Figure 1:
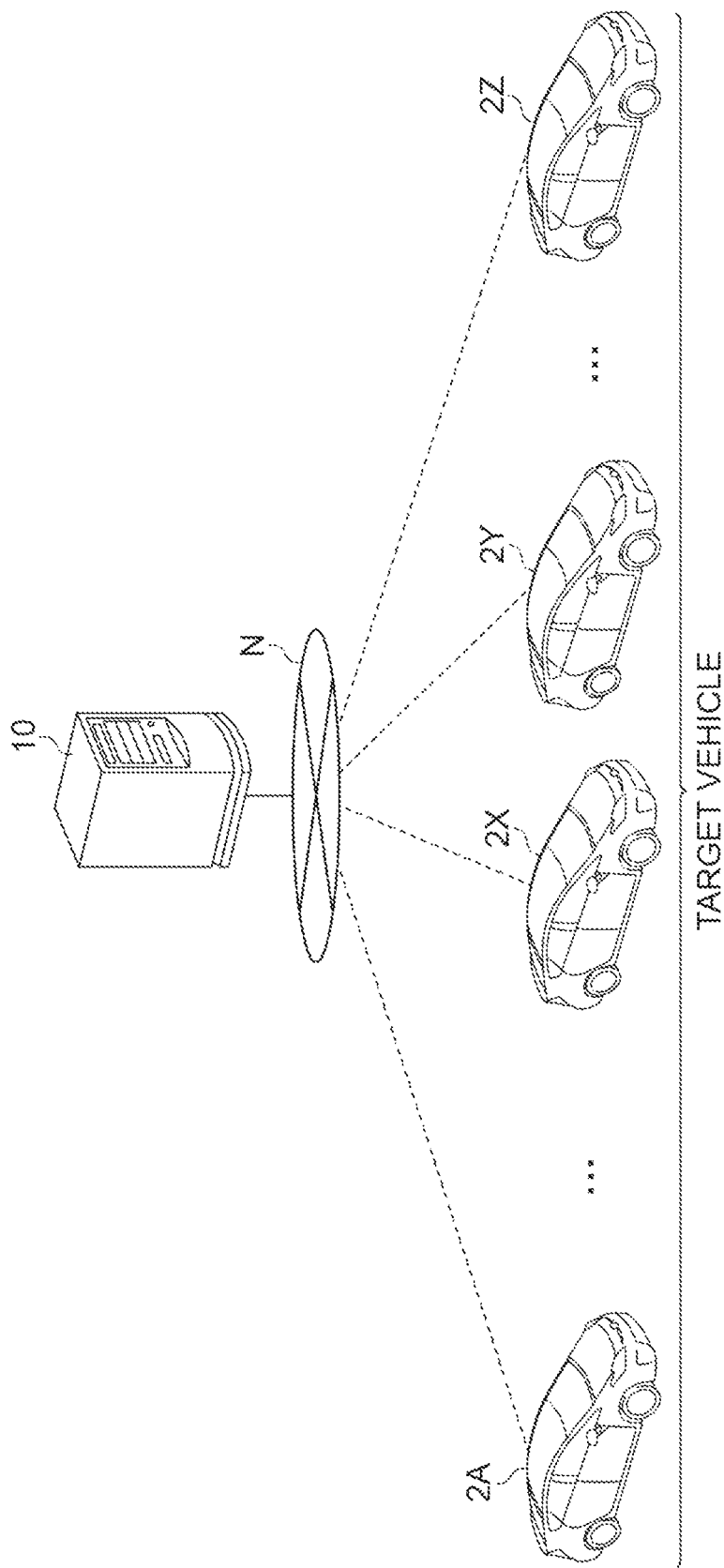
FIG. 1 is a diagram illustrating an information processing server and a target vehicle according to an embodiment.

FIG. 1 is a diagram illustrating an information processing server 10 and a target vehicle 2 according to the embodiment. As illustrated in FIG. 1, the information processing server 10 is communicably connected to the target vehicle 2 (2A to 2Z) via a network N. The network N is a wireless communication network. The target vehicle 2 means a vehicle on which information is collected by the information processing server 10. The target vehicle 2 includes a vehicle as a support target, on which various supports are performed from the information processing server 10. When the target vehicle 2 is described individually, target vehicles 2A to 2Z are used.

Figure 2:
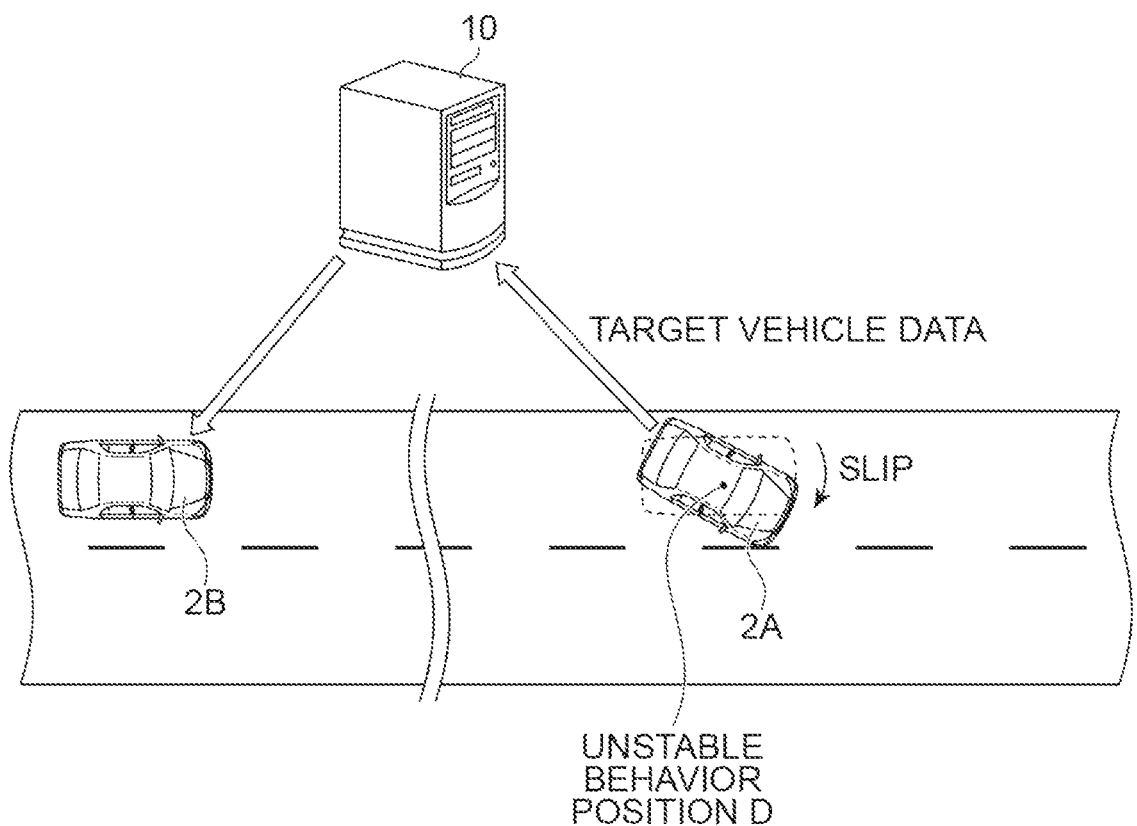
FIG. 2 is a diagram for explaining an example of information processing.

FIG. 2 is a diagram for explaining an example of information processing. As illustrated in FIG. 2, when the target vehicle 2A slips due to road surface freezing or the like, the target vehicle 2A transmits target vehicle data to the information processing server 10. The target vehicle data includes an unstable behavior position D which is the position at which the slip has occurred. The information processing server 10 notifies, for example, the target vehicle 2B traveling behind the target vehicle 2A, of information on the unstable behavior position. Thus, in the target vehicle 2B, it is possible to suppress the occurrence of slip of the target vehicle 2B at the unstable behavior position D. The unstable behavior position will be described in detail later.

Configuration of Target Vehicle

First, the configuration of the target vehicle 2 will be described. An identification (ID) (vehicle identification number) for identifying the vehicle is assigned to the target vehicle 2. The target vehicle 2 may be one, two or more, several tens or more, or several hundred or more. The target vehicle 2 does not have to be a vehicle having the same configuration, and may have a different vehicle type or the like. The target vehicle 2 may be an autonomous driving vehicle having an autonomous driving function, or may be a vehicle that does not have the autonomous driving function.

Figure 3:
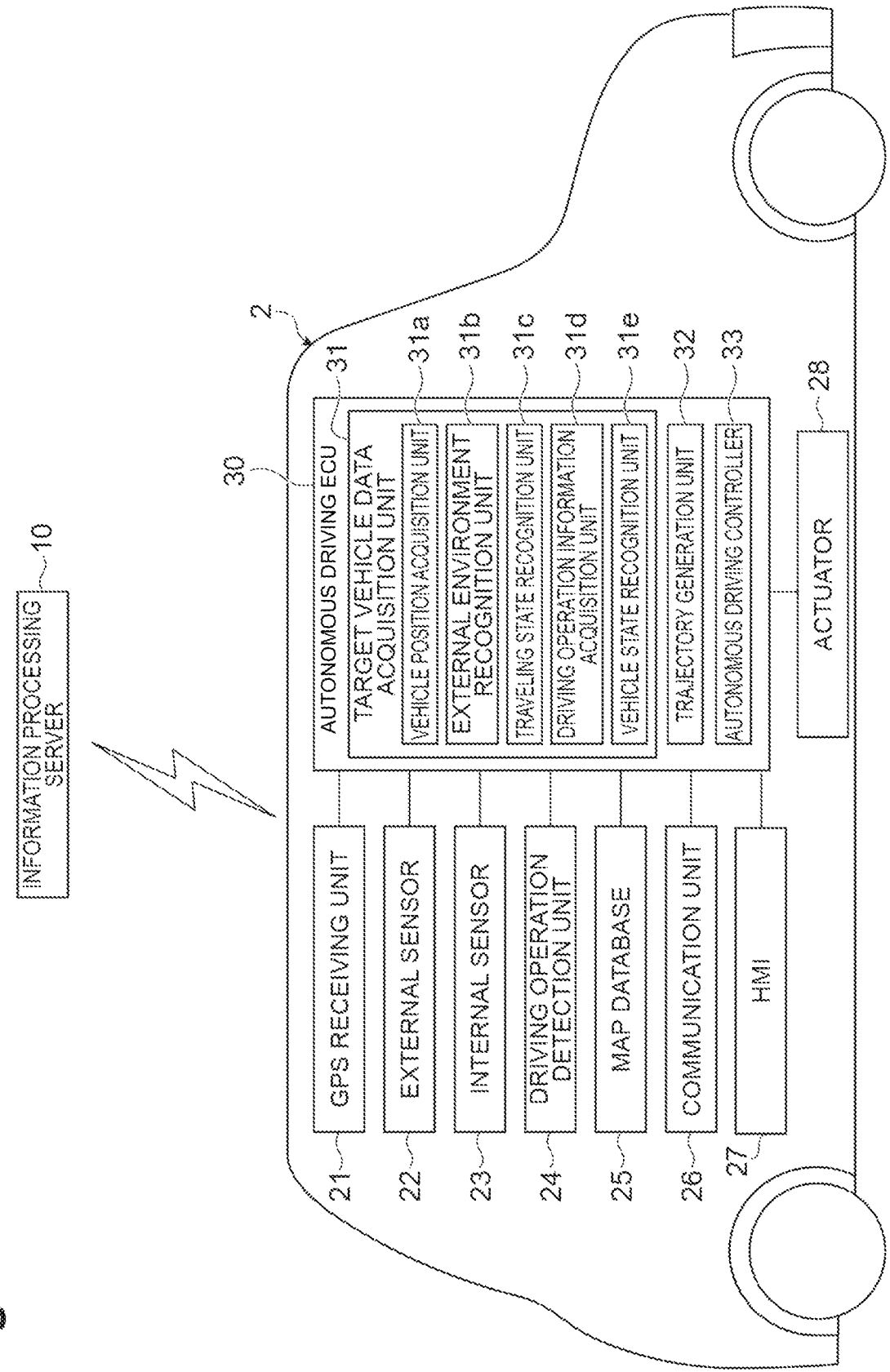
FIG. 3 is a block diagram illustrating an example of a configuration of the target vehicle.

The target vehicle 2 will be described below with reference to FIG. 3. FIG. 3 is a block diagram illustrating an example of the configuration of the target vehicle 2. Here, the target vehicle 2 will be described as an autonomous driving vehicle.

As illustrated in FIG. 3, the target vehicle 2 includes an autonomous driving ECU 30. The autonomous driving ECU 30 is an electronic control unit including a CPU, a ROM, a RAM, and the like. In the autonomous driving ECU 30, for example, various functions are realized by loading the program stored in the ROM into the RAM and the CPU executing the program loaded in the RAM. The autonomous driving ECU 30 may be constituted by a plurality of electronic units.

The autonomous driving ECU 30 is connected to a global positioning system (GPS) receiving unit 21, an external sensor 22, an internal sensor 23, a driving operation detection unit 24, a map database 25, a communication unit 26, a human machine interface (HMI) 27, and an actuator 28.

The GPS receiving unit 21 receives signals from three or more GPS satellites and measures the position of the target vehicle 2 (for example, the latitude and longitude of the target vehicle 2). The GPS receiving unit 21 transmits position information of the target vehicle 2, which is obtained by the measurement, to the autonomous driving ECU 30.

The external sensor 22 is a detection device that detects the external environment of the target vehicle 2. The external sensor 22 includes at least one of a camera and a radar sensor.

The camera is a capturing device that captures an image of the external environment of the target vehicle 2. The camera is provided behind the windshield of the target vehicle 2 and captures images of the front of the vehicle. The camera transmits captured-image information regarding the external environment of the target vehicle 2 to the autonomous driving ECU 30. The camera may be a monocular camera or a stereo camera.

The radar sensor is a detection device that detects an object around the target vehicle 2 by using radio waves (for example, millimeter waves) or light. The radar sensor includes, for example, a millimeter wave radar or a light detection and ranging (LIDAR). The radar sensor detects an object by transmitting radio waves or light to the vicinity of the target vehicle 2, and receiving the radio waves or light reflected by the object. The radar sensor transmits object information obtained by detection to the autonomous driving ECU 30. Objects include fixed objects such as guardrails and buildings, and moving objects such as pedestrians, bicycles, and other vehicles. The external sensor 22 may include an outside air temperature sensor that detects the outside air temperature of the target vehicle 2. The external sensor 22 may include a light sensor that detects the brightness of the outside.

The internal sensor 23 is a detection device that detects the state of the target vehicle 2. The internal sensor 23 includes a vehicle speed sensor, an acceleration sensor, and a yaw rate sensor, as sensors that detect the traveling state of the target vehicle 2. The vehicle speed sensor is a detector that detects the speed of the target vehicle 2. As the vehicle speed sensor, a wheel speed sensor that is provided for a wheel of the target vehicle 2 or a drive shaft that rotates integrally with the wheel, and the like can be used. The wheel speed sensor detects the rotation speed of each wheel. The vehicle speed sensor transmits vehicle speed information (wheel speed information) obtained by detection to the autonomous driving ECU 30.

The acceleration sensor is a detector that detects the acceleration of the target vehicle 2. The acceleration sensor includes, for example, a front-rear acceleration sensor that detects the acceleration of the target vehicle 2 in a front-rear direction. The acceleration sensor may include a lateral acceleration sensor that detects the lateral acceleration of the target vehicle 2. The acceleration sensor transmits, for example, acceleration information of the target vehicle 2 to the autonomous driving ECU 30. The yaw rate sensor is a detector that detects the yaw rate (rotational angular velocity) around a vertical shaft of the center of gravity of the target vehicle 2. As the yaw rate sensor, for example, a gyro sensor can be used. The yaw rate sensor transmits the yaw rate information of the target vehicle 2, which is obtained by the detection, to the autonomous driving ECU 30.

The internal sensor 23 detects at least one of a tire pressure, a wiper operating state, and a lighter state, as the vehicle state of the target vehicle 2. The tire pressure is the pressure of the tire of the target vehicle 2. The wiper operating state may include not only whether or not the wiper operates, but also the operating speed of the wiper. The lighter state includes a lighting state of a turn indicator. The lighter state may include whether or not a headlight lights and whether or not a fog lamp lights.

The internal sensor 23 may detect, as the vehicle state of the target vehicle 2, the brake pressure of a hydraulic brake system from a brake pressure sensor or detect an ON state/OFF state of a traveling support (for example, a vehicle stability control system described later). The internal sensor 23 may detect the load state of each wheel from a wheel load sensor as the vehicle state of the target vehicle 2. In addition, the internal sensor 23 may include a failure detection unit configured to detect various types of failure of the target vehicle 2.

The driving operation detection unit 24 detects the operation of an operation unit of the target vehicle 2 by a driver. The driving operation detection unit 24 includes, for example, a steering sensor, an accelerator sensor, and a brake sensor. The operation unit of the target vehicle 2 is a device for the driver to input an operation for driving the vehicle. The operation unit of the target vehicle 2 includes at least one of a steering unit, an accelerator operation unit, and a brake operation unit. The steering unit is, for example, a steering wheel. The steering unit is not limited to a wheel shape, and may be configured to function as a steering handle. The accelerator operation unit is, for example, an accelerator pedal. The brake operation unit is, for example, a brake pedal. The accelerator operation unit and the brake operation unit do not necessarily have to be pedals, and may be configured so as to allow the driver to input acceleration or deceleration. The operation unit may be an in-vehicle switch. An information terminal such as a smartphone of the driver may function as the operation unit.

The steering sensor detects the operation amount of the steering unit by the driver. The operation amount of the steering unit includes a steering angle. The operation amount of the steering unit may include steering torque. The accelerator sensor detects the operation amount of the accelerator operation unit by the driver. The operation amount of the accelerator operation unit includes, for example, the stepping amount of the accelerator pedal. The brake sensor detects the operation amount of the brake operation unit by the driver. The operation amount of the brake operation unit includes, for example, the stepping amount of the brake pedal. The brake sensor may have a form of detecting the master cylinder pressure of the hydraulic brake system. The stepping speed may be included in the operation amount of the accelerator operation unit and the brake operation unit. The driving operation detection unit 24 transmits operation amount information regarding the detected operation amount of the driver to the autonomous driving ECU 30.

The map database 25 is a database that stores map information. The map database 25 is formed in, for example, a storage device such as an HDD mounted on the target vehicle 2. The map information includes road position information, road shape information (for example, curvature information), position information of an intersection and a branch point, and the like. The map information may include traffic regulation information such as a legal speed, which is associated with position information. The map information may include target information used for position recognition of the target vehicle 2 on the map. Targets can include lane marking lines, traffic signals, guardrails, road markings, and the like. The map database 25 may be configured on a server (not limited to the information processing server 10) that is communicable with the target vehicle 2.

The communication unit 26 is a communication device that controls wireless communication with the outside of the target vehicle 2. Various types of information are transmitted and received via the network N. The communication unit 26 transmits various types of information to the information processing server 10 in response to the signal from the autonomous driving ECU 30.

The HMI 27 is an interface for inputting and outputting information between the autonomous driving ECU 30, and the driver or an occupant. The HMI 27 includes, for example, a display, a speaker, and the like provided in the vehicle interior. The HMI 27 outputs an image on the display and outputs an audio from the speaker, in response to a control signal from the autonomous driving ECU 30.

The actuator 28 is a device used to control the target vehicle 2. The actuator 28 includes at least a drive actuator, a brake actuator, and a steering actuator. The drive actuator controls the amount (throttle opening) of air supplied to the engine in response to a control signal from the autonomous driving ECU 30, and controls the driving force of the target vehicle 2. When the target vehicle 2 is a hybrid vehicle, a control signal from the autonomous driving ECU 30 is input to a motor as a power source, and the driving force is controlled, in addition to the amount of air supplied to the engine. When the target vehicle 2 is an electric vehicle, a control signal from the autonomous driving ECU 30 is input to the motor as the power source, and the driving force is controlled. The motor as the power source in the above cases constitutes the actuator 28.

The brake actuator controls a brake system in response to the control signal from the autonomous driving ECU 30, and controls a braking force applied to the wheels of the target vehicle 2. As the brake system, for example, a hydraulic brake system can be used. The steering actuator controls the drive of an assist motor that controls the steering torque in an electric power steering system in response to the control signal from the autonomous driving ECU 30. Thus, the steering actuator controls the steering torque of the target vehicle 2.

Next, the functional configuration of the autonomous driving ECU 30 will be described. As illustrated in FIG. 3, the autonomous driving ECU 30 includes a target vehicle data acquisition unit 31, a trajectory generation unit 32, and an autonomous driving controller 33. Some of the functions of the autonomous driving ECU 30 described below may be performed on a server (not limited to the information processing server 10) that is communicable with the target vehicle 2.

The target vehicle data acquisition unit 31 acquires target vehicle data which is data regarding the target vehicle 2. The target vehicle data includes the position information of the target vehicle 2 on the map and the traveling state of the target vehicle 2. The target vehicle data may include the external environment of the target vehicle 2 or may include the route on which the target vehicle 2 travels. The target vehicle data may include driving operation information by the driver of the target vehicle 2 and the vehicle state of the target vehicle 2. The target vehicle data acquisition unit 31 transmits the acquired target vehicle data to the information processing server 10.

The target vehicle data acquisition unit 31 includes a vehicle position acquisition unit 31a, an external environment recognition unit 31b, a traveling state recognition unit 31c, a driving operation information acquisition unit 31d, and a vehicle state recognition unit 31e.

The vehicle position acquisition unit 31a acquires the position information of the target vehicle 2 on the map based on the position information of the GPS receiving unit 21 and the map information of the map database 25. The vehicle position acquisition unit 31a may acquire the position information of the target vehicle 2 by the simultaneous localization and mapping (SLAM) technique with the target information included in the map information in the map database 25 and the detection result of the external sensor 22. The vehicle position acquisition unit 31a may recognize the lateral position of the target vehicle 2 with respect to the lane (the position of the target vehicle 2 in a lane width direction) from the positional relationship between the lane marking line and the target vehicle 2, and include the recognized lateral position in the position information. The vehicle position acquisition unit 31a may acquire the position information of the target vehicle 2 on the map by another well-known method.

The external environment recognition unit 31b recognizes the external environment of the target vehicle 2 based on the detection result of the external sensor 22. The external environment includes the relative position of surrounding objects with respect to the target vehicle 2. The external environment may include the relative speed and the moving direction of the surrounding objects with respect to the target vehicle 2. The external environment may include types of objects such as other vehicles, pedestrians, and bicycles. The type of object can be identified by a well-known method such as pattern matching. The external environment may include the result of lane marking recognition (white line recognition) around the target vehicle 2. The external environment may include the outside air temperature and may include weather.

The traveling state recognition unit 31c recognizes the traveling state of the target vehicle 2 based on the detection result of the internal sensor 23. The traveling state includes the vehicle speed of the target vehicle 2 and the yaw rate of the target vehicle 2. The traveling state may include the acceleration of the target vehicle 2. Specifically, the traveling state recognition unit 31c recognizes the vehicle speed of the target vehicle 2 based on the vehicle speed information of the vehicle speed sensor. The traveling state recognition unit 31c recognizes the acceleration of the target vehicle 2 based on the acceleration information of the acceleration sensor. The traveling state recognition unit 31c recognizes the direction of the target vehicle 2 based on the yaw rate information of the yaw rate sensor.

The driving operation information acquisition unit 31d acquires the driving operation information of the target vehicle 2 based on the detection result of the driving operation detection unit 24. The driving operation information includes, for example, at least one of the accelerator operation amount, the brake operation amount, and the steering amount of the driver.

When the target vehicle 2 has a personal authentication function, the driving operation information acquisition unit 31d stores the driving operation history for each driver who has personally authenticated. The driving operation history may be associated with the external environment and the traveling state of the target vehicle 2. The autonomous driving ECU 30 does not necessarily have to include the driving operation information acquisition unit 31d. In this case, the driving operation detection unit 24 is also unnecessary.

The vehicle state recognition unit 31e recognizes the vehicle state of the target vehicle 2 based on the detection result of the internal sensor 23. The vehicle state may include the tire pressure. The vehicle state may include the wiper operating state and the lighter state, and may include a failure state of the target vehicle 2. The autonomous driving ECU 30 does not necessarily have to include the vehicle state recognition unit 31e.

The trajectory generation unit 32 generates a trajectory used for autonomous driving of the target vehicle 2. The trajectory generation unit 32 generates the trajectory for the autonomous driving based on a travel route set in advance, the map information, the position of the target vehicle 2 on the map, the external environment of the target vehicle 2, and the traveling state of the target vehicle 2.

The travel route is a route on which the target vehicle 2 travels in autonomous driving. The trajectory generation unit 32 obtains the travel route for the autonomous driving, for example, based on a destination, the map information, and the position of the target vehicle 2 on the map. The travel route may be set by a well-known navigation system. The destination may be set by the occupant of the target vehicle 2, or may be automatically proposed by the autonomous driving ECU 30 or the navigation system.

The trajectory includes a path on which the vehicle travels in autonomous driving, and a vehicle speed profile in the autonomous driving. The path is a locus on which a vehicle that is autonomously driving is scheduled to travel on the travel route. The path can be set in, for example, data (steering angle profile) of the steering angle change of the target vehicle 2 in accordance with the position on the travel route. The position on the travel route is, for example, a set vertical position set at predetermined intervals (for example, 1 m) in a traveling direction on the travel route. The steering angle profile is data in which a target steering angle is associated with each set vertical position.

The trajectory generation unit 32 generates a path on which the vehicle travels, for example, based on the travel route, the map information, the external environment of the target vehicle 2, and the traveling state of the target vehicle 2. The trajectory generation unit 32 generates the path, for example, so that the target vehicle 2 passes through the center of the lane included in the travel route (center in the lane width direction).

Instead of the steering angle profile, a steering torque profile in which a target steering torque is associated with each set vertical position may be used. Further, instead of the steering angle profile, a lateral position profile in which a target lateral position is associated with each set vertical position may be used. The target lateral position refers to a target position in the lane width direction. In this case, the set vertical position and the target lateral position may be set as one position coordinate in total.

The vehicle speed profile refers to, for example, data in which a target vehicle speed is associated with each set vertical position. The set vertical position may be set based on the traveling time of the vehicle instead of the distance. The set vertical position may be set as an arrival position of the vehicle after 1 second and the arrival position of the vehicle after 2 seconds.

The trajectory generation unit 32 generates the vehicle speed profile based on speed-related information such as the legal speed, which is included in the path and the map information, for example. Instead of the legal speed, a speed set in advance for a position or a section on the map may be used. The trajectory generation unit 32 generates the trajectory for autonomous driving from the path and the vehicle speed profile. A method of generating the trajectory in the trajectory generation unit 32 is not limited to the above-described contents, and other well-known methods can be adopted.

When the trajectory generation unit 32 receives a notification of a traveling path change for avoiding an unstable behavior position from the information processing server 10, the trajectory generation unit 32 changes the path of the target vehicle 2 so as not to pass through the unstable behavior position. The trajectory generation unit 32 may change the travel route (traveling road) on which the target vehicle 2 travels, or may change the path of the target vehicle 2 so that the target vehicle 2 is separated from the unstable behavior position by a predetermined distance or more in a road width direction on the same road.

When the trajectory generation unit 32 receives a notification of unstable behavior position information and stable traveling data from the information processing server 10, the trajectory generation unit 32 generates the trajectory based on the unstable behavior position information and the stable traveling data such that the target vehicle 2 does not perform an unstable behavior. The unstable behavior position information and the stable traveling data will be described in detail later. The trajectory generation unit 32 generates the trajectory such that the traveling state of the target vehicle 2 is brought close to the traveling state in the stable traveling data, in the vicinity of the unstable behavior position. When the trajectory generation unit 32 receives a stable traveling instruction instead of the notification of the stable traveling data from the information processing server 10, the trajectory generation unit 32 generates the trajectory in accordance with the stable traveling instruction. The stable traveling instruction will be described in detail later.

The autonomous driving controller 33 performs the autonomous driving of the target vehicle 2. The autonomous driving controller 33 performs the autonomous driving of the target vehicle 2, for example, based on the external environment of the target vehicle 2, the traveling state of the target vehicle 2, and the trajectory generated by the trajectory generation unit 32. The autonomous driving controller 33 performs autonomous driving of the target vehicle 2 by transmitting a control signal to the actuator 28.

When the autonomous driving controller 33 receives an instruction to cancel the autonomous driving from the information processing server 10, the autonomous driving controller 33 cancels the autonomous driving at the unstable behavior position. The autonomous driving controller 33 notifies the driver of the transition to manual driving, through the HMI 27. After notifying the driver, the autonomous driving controller 33 cancels the autonomous driving and transitions to the manual driving of the driver. The autonomous driving controller 33 notifies the driver of the unstable behavior position information received from the information processing server 10, through the HMI 27.

The target vehicle 2 does not necessarily have to be an autonomous driving vehicle. In this case, an ECU of the target vehicle 2 does not need to include the trajectory generation unit 32 and the autonomous driving controller 33. The ECU of the target vehicle 2 may include an information providing unit capable of notifying the driver of the unstable behavior position information and the like through the HMI 27. The ECU of the target vehicle 2 may include a driving support unit configured to, when receiving the notification of the stable traveling data from the information processing server 10, perform a driving support so that the traveling state of the target vehicle 2 is brought close to the traveling state in the stable traveling data, in the vicinity of the unstable behavior position. A method of the driving support is not particularly limited, and information may be provided to the driver, or traveling control of the vehicle may be performed.

Configuration of Information Processing Server

Figure 4:
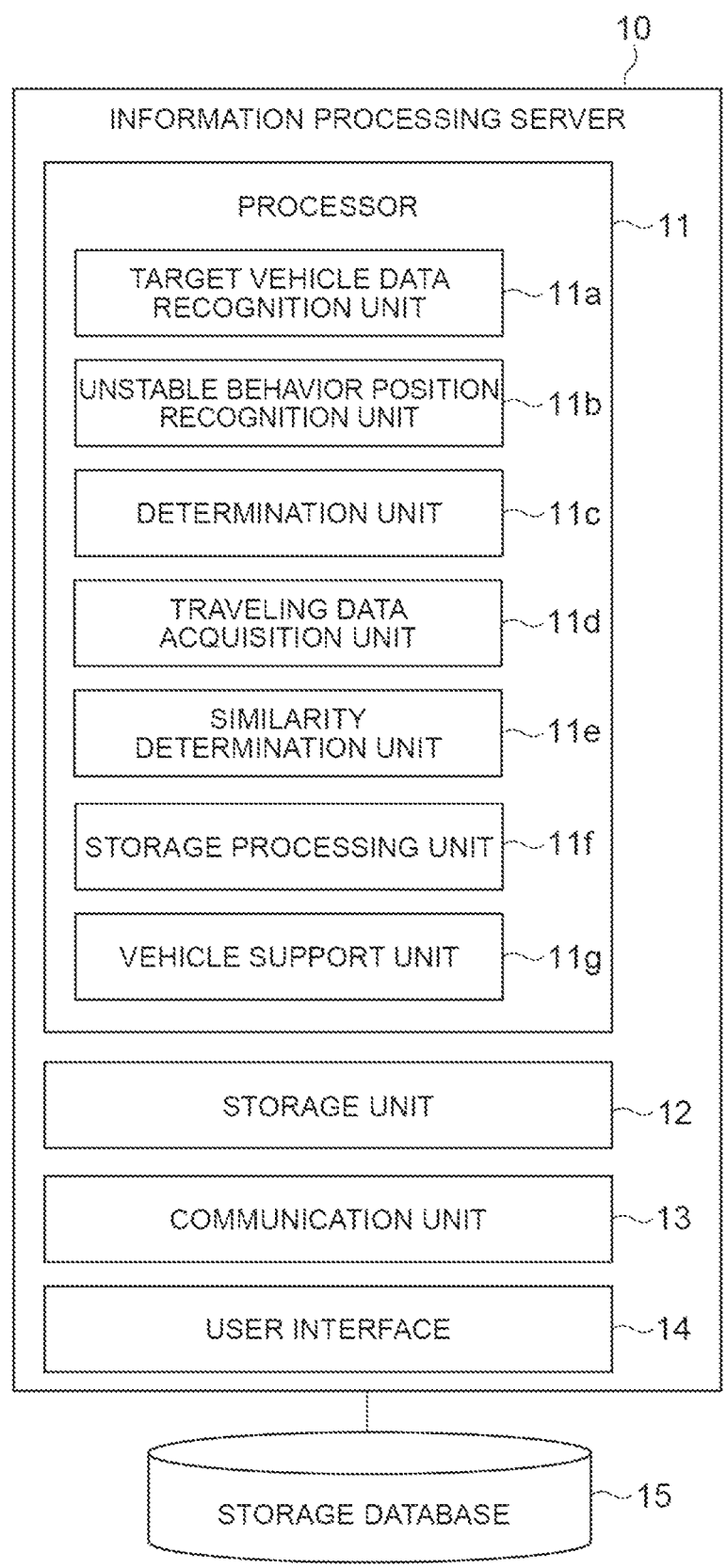
FIG. 4 is a block diagram illustrating an example of a configuration of the information processing server.

The information processing server 10 is provided in a facility such as an information management center, and is configured to be communicable with the target vehicle 2. FIG. 4 is a block diagram illustrating an example of the configuration of the information processing server 10. The information processing server 10 illustrated in FIG. 4 is configured as a general computer including a processor 11, a storage unit 12, a communication unit 13, and a user interface 14.

The processor 11 controls the information processing server 10, for example, by operating an operating system. The processor 11 is an arithmetic unit such as a central processing unit (CPU), that includes a control device, an arithmetic device, a register, and the like. The processor 11 controls the storage unit 12, the communication unit 13, and the user interface 14. The storage unit 12 is configured to include at least one of a memory and a storage. The memory is a recording medium such as a read only memory (ROM) and a random access memory (RAM). The storage is a recording medium such as a hard disk drive (HDD).

The communication unit 13 is a communication device for performing communication via the network N. As the communication unit 13, a network device, a network controller, a network card, or the like can be used. The user interface 14 is a device that includes an output device such as a display and a speaker, and an input device such as a touch panel. The information processing server 10 does not necessarily have to be provided in the facility, and may be mounted on a moving body such as a vehicle or a ship.

The information processing server 10 is connected to a storage database 15. The storage database 15 is a database for storing the unstable behavior position information and the like. The storage database 15 can have the similar configuration to the well-known database of the HDD. The storage database 15 may be provided in a facility or the like away from the information processing server 10.

Next, the functional configuration of the processor 11 will be described. As illustrated in FIG. 4, the processor 11 includes a target vehicle data recognition unit 11a, an unstable behavior position recognition unit 11b, a determination unit 11c, a traveling data acquisition unit 11d, a similarity determination unit 11e, a storage processing unit 11f, and a vehicle support unit 11g.

The target vehicle data recognition unit 11a recognizes the target vehicle data transmitted from the target vehicle 2. The target vehicle data includes the position information of the target vehicle 2 on the map and the traveling state of the target vehicle 2. The target vehicle data may include the external environment of the target vehicle 2 or may include the route on which the target vehicle 2 travels.

The unstable behavior position recognition unit 11b recognizes the unstable behavior position being the position on the map at which the target vehicle 2 has performed the unstable behavior, based on the target vehicle data acquired by the target vehicle data recognition unit 11a. The unstable behavior refers to the behavior of a vehicle that makes the traveling of the vehicle unstable. The unstable behavior includes, for example, slip. The unstable behavior may include sudden deceleration or a sudden change in steering angle. The unstable behavior may include a lane deviation of the target vehicle 2 or may include an excessive approach of the target vehicle 2 to an object.

First, determination of the unstable behavior will be described. The unstable behavior position recognition unit 11b determines whether or not the target vehicle 2 has performed an unstable behavior, based on the target vehicle data. The unstable behavior position recognition unit 11b determines that the target vehicle 2 has slipped as the unstable behavior, for example, based on at least one of the acceleration detected by the acceleration sensor (front-rear acceleration and lateral acceleration), the wheel speed of each wheel, which is detected by the wheel speed sensor, the yaw rate detected by the yaw rate sensor, the steering angle of the driver, which is detected by the steering sensor, the brake operation amount of the driver, which is detected by the brake sensor, and the brake pressure of the brake pressure sensor. Instead of the brake operation amount of the brake sensor, the master cylinder pressure of the hydraulic brake system may be used.

The unstable behavior position recognition unit 11b may use an operation start condition of the well-known antilock brake system (ABS) as the slip determination. For example, in an antilock brake system, as an example, the wheel speed of each wheel is compared with the estimated vehicle body speed. When the wheel considered to be locked is specified, the antilock brake system operates. The estimated vehicle body speed may be obtained from the wheel speed of each wheel until slipping, or may be obtained from the change in acceleration until slipping.

In addition, the unstable behavior position recognition unit 11*b* may use an operation start condition of the well-known vehicle stability control system (VS C) or use an operation start condition of the well-known traction control system (TRC), as the slip determination. Traction control can also be operated when a spinning wheel is specified by comparing the wheel speed of each wheel with the estimated vehicle body speed. The unstable behavior position recognition unit 11*b* may determine the slip of the target vehicle 2 by another well-known method.

The unstable behavior position recognition unit 11*b* may determine whether or not the target vehicle 2 has suddenly decelerated as the unstable behavior, based on the deceleration detected by the acceleration sensor. In this case, the unstable behavior position recognition unit 11*b* determines that the target vehicle 2 has suddenly decelerated, for example, when the absolute value of the deceleration becomes equal to or more than a sudden deceleration threshold value. The sudden deceleration threshold value is a threshold value of a value set in advance. The threshold value used in the description means the threshold value of the value set in advance, below.

The unstable behavior position recognition unit 11*b* may determine whether or not a sudden change in steering angle has occurred in the target vehicle 2 as the unstable behavior, based on the yaw rate detected by the yaw rate sensor. In this case, the unstable behavior position recognition unit 11*b* determines that the sudden change in steering angle has occurred in the target vehicle 2, for example, when the yaw rate becomes equal to or more than a steering angle change threshold value. The tire turning angle may be used instead of the yaw rate.

When the turn indicator is not lit, the unstable behavior position recognition unit 11*b* may determine whether or not the target vehicle 2 has deviated from the lane as the unstable behavior, based on the lateral position of the target vehicle 2 or the external environment of the target vehicle 2. In this case, the unstable behavior position recognition unit 11*b* determines the lane deviation, for example, from the lateral position of the target vehicle 2. Alternatively, the unstable behavior position recognition unit 11*b* may determine the lane deviation when the unstable behavior position recognition unit 11*b* recognizes that the target vehicle 2 has straddled the lane marking line, from the external environment of the target vehicle 2.

The unstable behavior position recognition unit 11*b* may determine whether or not the target vehicle 2 has excessively approached an object as the unstable behavior, based on the traveling state of the target vehicle 2 and the external environment of the target vehicle 2. In this case, when the target vehicle 2 is at low speed, the small distance from the object does not mean the unstable behavior. Thus, the unstable behavior position recognition unit 11*b* determines that the target vehicle 2 has excessively approached the object when the vehicle speed of the target vehicle 2 is equal to or higher than a vehicle speed threshold value, and the time to collision (TTC) between the target vehicle 2 and the object is equal to or smaller than a TTC threshold value. Instead of the time to collision, a time headway (THW) or the distance may be used.

Whether or not the target vehicle 2 has performed the unstable behavior may be performed every time the target vehicle data is acquired, or may be collectively determined at predetermined time intervals or predetermined period intervals. The determination of whether or not the target vehicle 2 has performed the unstable behavior may be performed while the target vehicle 2 is stopped.

Next, recognition of the unstable behavior position will be described. The unstable behavior position refers to a position of the target vehicle 2 on the map when the target vehicle 2 has performed the unstable behavior. When determining that the target vehicle 2 has performed the unstable behavior, the unstable behavior position recognition unit 11*b* recognizes the unstable behavior position.

The unstable behavior position recognition unit 11*b* recognizes the unstable behavior position based on the position information of the target vehicle 2 on the map when the unstable behavior position recognition unit 11*b* determines that the target vehicle 2 has performed the unstable behavior. The unstable behavior position is recognized separately for each lane. When the unstable behavior is the lane deviation, the unstable behavior position may be a position on the traveling lane before the lane deviation, or may be a position on the lane marking.

The unstable behavior position may be recognized as a section or an area instead of a point on the map. When the target vehicle 2 slides while slipping, the unstable behavior position recognition unit 11*b* may set the start position of the slip as the unstable behavior position, or may recognize the entirety of a section in which the target vehicle 2 moves in a state of being determined to slip, as the unstable behavior position. The area may be a range within a predetermined distance centered on the slipped target vehicle 2, or may be a district or divided area in which the target vehicle 2 is traveling. The same applies to other unstable behaviors.

The determination unit 11*c* determines whether the unstable behavior position is in a continuous occurrence situation or a discontinuous situation, based on whether or not a plurality of target vehicles 2 have performed the unstable behavior at the unstable behavior position recognized by the unstable behavior position recognition unit 11*b*.

The determination unit 11*c* determines whether or not the target vehicle 2 has passed through the unstable behavior position, for example, based on the target vehicle data recognized by the target vehicle data recognition unit 11*a* and the unstable behavior position recognized by the unstable behavior position recognition unit 11*b*. When determining that the target vehicle 2 has passed through the unstable behavior position, the determination unit 11*c* determines whether the unstable behavior position is in a continuous occurrence situation or a discontinuous situation, based on whether or not the target vehicle 2 has performed the unstable behavior. The determination unit 11*c* may make the above determination by collectively processing a plurality of pieces of target vehicle data at predetermined period intervals.

The continuous occurrence situation refers to a situation in which the unstable behavior is continuously occurring. In the case of the continuous occurrence situation, it can be considered that it is less likely that the unstable behavior has occurred due to individual vehicle factors of the target vehicle 2, and it is more likely that the unstable behavior has occurred due to external factors such as the road environment. The discontinuous situation refers to a situation that is not the continuous occurrence situation. In the case of the discontinuous situation, it can be considered that it is more likely that the unstable behavior has occurred due to the individual vehicle factor of the target vehicle 2. When not determining that the unstable behavior position is in the continuous occurrence situation, the determination unit 11*c* determines that the unstable behavior position is in the discontinuous situation.

Figure 5A:
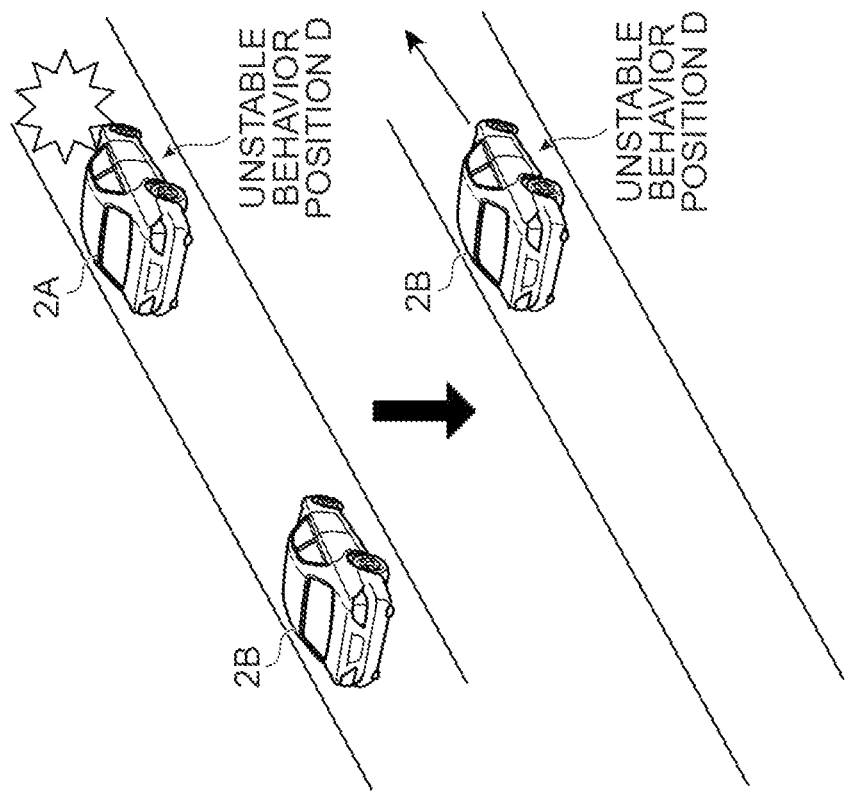
FIG. 5A is a diagram for explaining an example of a continuous occurrence situation.
Figure 5B:
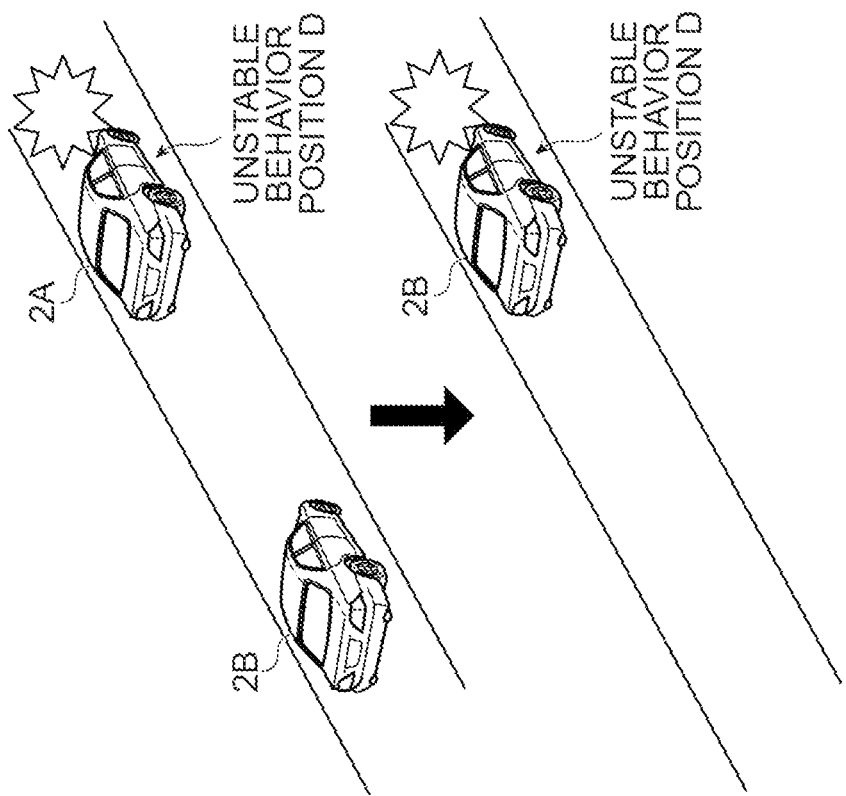
FIG. 5B is a diagram for explaining an example of a discontinuous situation.

FIG. 5A is a diagram for explaining an example of the continuous occurrence situation. As illustrated in FIG. 5A, as an example, when the two target vehicles 2A and 2B have continuously performed the unstable behavior at the unstable behavior position D, the determination unit 11c determines that the unstable behavior position is in the continuous occurrence situation. FIG. 5B is a diagram for explaining an example of the discontinuous situation. Even if the target vehicle 2A has performed the unstable behavior at the unstable behavior position D, the determination unit 11c may determine that the unstable behavior position is in the discontinuous situation when the following target vehicle 2B passes without performing the unstable behavior.

The situation determined to be the continuous occurrence situation is not limited to the situation illustrated in FIG. 5A. When the three target vehicles 2A to 2C have continuously performed the unstable behavior, the determination unit 11c may determine that the unstable behavior position D is in the continuous occurrence situation. When four or more target vehicles 2 have continuously performed the unstable behavior, the determination unit 11c may determine that the unstable behavior position D is in the continuous occurrence situation. When all of a plurality of target vehicles 2 passing through the unstable behavior position D within a predetermined time have performed the unstable behavior, the determination unit 11c may determine that the unstable behavior position D is in the continuous occurrence situation.

Even if there is one target vehicle 2 that has not performed the unstable behavior, the determination unit 11c may determine that the unstable behavior position D is in the continuous occurrence situation, when the unstable behavior has occurred in the target vehicles before and after the one target vehicle 2. Specifically, when the target vehicle 2B in the middle of the three target vehicles 2A to 2C passes through the unstable behavior position D without performing the unstable behavior, but the target vehicles 2A and 2C have performed the unstable behavior, the determination unit 11c may determine that the unstable behavior position D is in the continuous occurrence situation. Alternatively, even if there are a plurality of target vehicles 2 that do not have performed the unstable behavior, the determination unit 11c may determine that the unstable behavior position D is in the continuous occurrence situation, when the number of target vehicles 2 that have performed the unstable behavior within a predetermined time is equal to or more than a threshold value.

Figures 6A, 6B:
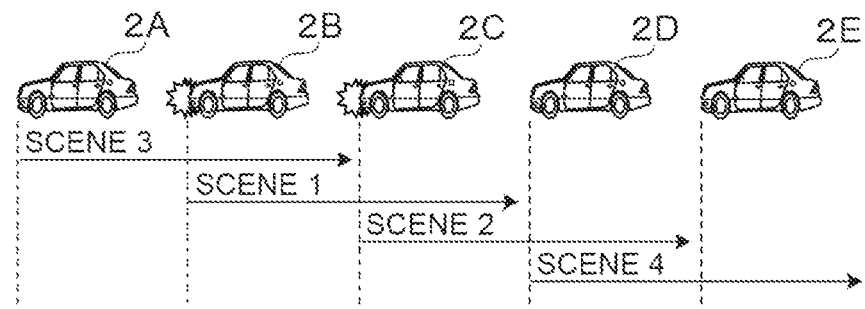
FIG. 6A is a table for explaining an example of scene classification of an unstable behavior.
FIG. 6B is a diagram for explaining another example of the scene classification of the unstable behavior.

The determination unit 11c may determine the continuous occurrence situation and the discontinuous situation by a finer classification. Here, FIG. 6A is a table for explaining an example of scene classification of the unstable behavior. As illustrated in FIG. 6A, four scenes can be classified in a manner that two target vehicles 2 being the target vehicle 2 that precedes the unstable behavior position and the target vehicle 2 that follows the unstable behavior position attract attentions, and are classified by whether or not the unstable behavior has been performed.

In FIG. 6A, a case where both the preceding target vehicle 2 and the following target vehicle 2 have performed the unstable behavior is set to Scene 1, and a case where only the preceding target vehicle 2 has performed the unstable behavior is set to Scene 2. A case where only the following target vehicle 2 has performed the unstable behavior is set as Scene 3, and a case where neither the preceding target vehicle 2 nor the following target vehicle 2 has performed the unstable behavior is set as Scene 4. For example, Scene 1 corresponds to the continuous occurrence situation, and Scenes 2 to 4 correspond to the discontinuous situation.

FIG. 6B is a diagram for explaining another example of the scene classification of the unstable behavior. It is assumed that the target vehicles 2A to 2F have passed through the same unstable behavior position in this order. In FIG. 6B, only the target vehicle 2B and the target vehicle 2C among the target vehicles 2A to 2E have performed the unstable behavior, and the remaining target vehicles pass through the unstable behavior position without performing the unstable behavior.

Focusing on two target vehicles of the target vehicle 2A and the target vehicle 2B in FIG. 6B, this corresponds to Scene 3 in which only the following target vehicle 2B has performed the unstable behavior. Focusing on the target vehicle 2B and the target vehicle 2C, this corresponds to Scene 1 in which both the preceding target vehicle 2B and the following target vehicle 2C have performed the unstable behavior. Focusing on the target vehicle 2C and the target vehicle 2D, this corresponds to Scene 2 in which only the preceding target vehicle 2C has performed the unstable behavior. Focusing on the target vehicle 2D and the target vehicle 2E, this corresponds to Scene 4 in which none of the target vehicles 2 has performed the unstable behavior. As described above, the determination unit 11c may make a determination of classifying Scenes 1 to 4.

When the unstable behavior position recognition unit 11b recognizes the unstable behavior position, the traveling data acquisition unit 11d acquires the unstable traveling data based on the target vehicle data recognized by the target vehicle data recognition unit 11a. The unstable traveling data is data regarding the previous traveling state of the target vehicle 2 in which the unstable behavior has occurred at the unstable behavior position. The unstable traveling data can be set to, for example, data on the traveling state of the target vehicle 2 from a position in front of the unstable behavior position by a predetermined distance to the unstable behavior position. The unstable traveling data may be data on the traveling state of the target vehicle 2 for a predetermined time until the unstable behavior occurs. The unstable traveling data may include the traveling locus of the target vehicle 2.

When the determination unit 11c determines that the unstable behavior position is in the discontinuous situation, the traveling data acquisition unit 11d acquires stable traveling data or unstable traveling data based on the target vehicle data.

The stable traveling data is data regarding the previous traveling state of the target vehicle 2 which has passed through the unstable behavior position in a discontinuous situation without the unstable behavior occurring. The stable traveling data can be set to, for example, data on the traveling state of the target vehicle 2 from a position in front of the unstable behavior position by a predetermined distance to the unstable behavior position. The stable traveling data may be data on the traveling state of the target vehicle 2 for a predetermined time until the target vehicle reaches the unstable behavior position. The stable traveling data may include the traveling locus of the target vehicle 2.

The similarity determination unit 11e determines whether or not there is the target vehicle 2 heading toward the unstable behavior position determined to be in the discontinuous situation, based on the target vehicle data recognized by the target vehicle data recognition unit 11a, the unstable behavior position recognized by the unstable behavior position recognition unit 11b, and the determination result of the determination unit 11c. For example, when the unstable behavior position is provided in front of the target vehicle 2 and a distance between the unstable behavior position and the target vehicle 2 is less than a threshold value, the similarity determination unit 11e determines that there is the target vehicle 2 heading toward the unstable behavior position. The determination may be made by using the arrival time instead of the distance. In addition, the similarity determination unit 11e may perform the above determination by a well-known method.

When there is the target vehicle 2 heading toward the unstable behavior position determined to be in the discontinuous situation, the similarity determination unit 11e determines whether or not the traveling state of the target vehicle 2 is similar to the traveling state in the unstable traveling data.

For example, when a state where a difference between the vehicle speed of the target vehicle 2 and the vehicle speed in the unstable traveling data is less than a similar vehicle speed threshold value, and a difference between the yaw rate of the target vehicle 2 and the yaw rate in the unstable traveling data is less than a similar yaw rate threshold value continues for a setting time (set in advance) or longer, the similarity determination unit 11e determines that the traveling state of the target vehicle 2 is similar to the traveling state in the unstable traveling data.

The similarity determination unit 11e may create an unstable behavior identification model in which an unstable behavior has occurred, from a plurality of pieces of unstable traveling data, and create a stable behavior identification model in which the unstable behavior does not occur, from a plurality of pieces of stable traveling data. When the traveling state of the target vehicle 2 is closer to the unstable behavior identification model than the stable behavior identification model, the similarity determination unit 11e may determine that the traveling state of the target vehicle 2 is similar to the traveling state in the unstable traveling data. When the traveling state of the target vehicle 2 is closer to the stable behavior identification model than the unstable behavior identification model, the similarity determination unit 11e determines that the traveling state of the target vehicle 2 is not similar to the traveling state in the unstable traveling data. A method of similarity determination in the similarity determination unit 11e is not particularly limited. The similarity determination unit 11e can determine whether or not the traveling state of the target vehicle 2 is similar to the traveling state in the unstable traveling data, by various well-known methods.

The similarity determination unit 11e may determine whether or not there is the target vehicle 2 heading toward the unstable behavior position determined to be in the continuous occurrence situation. When there is the target vehicle 2 heading toward the unstable behavior position determined to be in the continuous occurrence situation, the similarity determination unit 11e may determine whether or not the traveling state of the target vehicle 2 is similar to the traveling state in the unstable traveling data.

The storage processing unit 11f stores unstable behavior position information regarding the unstable behavior position recognized by the unstable behavior position recognition unit 11b, in the storage database 15. When the determination unit 11c has performed the determination, the storage processing unit 11f stores the unstable behavior position and the determination result of the determination unit 11c in the storage database 15 in association with each other.

The storage processing unit 11f stores the unstable traveling data and the stable traveling data acquired by the traveling data acquisition unit 11d, in the storage database 15 in association with the unstable behavior position.

The vehicle support unit 11g performs various supports on the target vehicle 2 by information notification and instructions. The vehicle support unit 11g performs various supports on the target vehicle 2 via the communication unit 13. The vehicle support unit 11g determines whether or not there is a target vehicle 2 heading toward the unstable behavior position in the continuous occurrence situation. For such determination of the target vehicle 2, the similar method to the method in the similarity determination unit 11e can be adopted.

When it is determined that there is the target vehicle 2 heading toward the unstable behavior position in the continuous occurrence situation, the vehicle support unit 11g notifies the target vehicle 2 of the unstable behavior position information. The vehicle support unit 11g may instruct the target vehicle 2 to change a traveling path such that the target vehicle 2 avoids the unstable behavior position, along with the notification of the unstable behavior position information. The target vehicle 2 instructed to change the traveling path avoids the occurrence of the unstable behavior at the unstable behavior position by changing the route (road) or the traveling path in the road.

When the target vehicle 2 is autonomously driving and it is determined that the unstable behavior position toward which the target vehicle 2 heads is in the continuous occurrence situation, the vehicle support unit 11g may issue an instruction to cancel autonomous driving at the unstable behavior position along with the notification of the unstable behavior position information. By canceling the autonomous driving and transitioning to the manual driving by the driver, the target vehicle 2 can avoid an occurrence of a situation in which the target vehicle 2 performs the unstable behavior at the unstable behavior position while maintaining the autonomous driving.

When it is determined that there is the target vehicle 2 heading toward the unstable behavior position in the discontinuous situation, the vehicle support unit 11g may issue a notification of stable traveling data along with the notification of the unstable behavior position information. The stable traveling data is data on the previous traveling state of the target vehicle 2 that has not performed the unstable behavior at the unstable behavior position. The target vehicle 2 can suppress performing of the unstable behavior by referring to the stable traveling data.

The vehicle support unit 11g may issue a notification of the unstable behavior position information when it is determined that the unstable behavior position is in the continuous occurrence situation, and may not issue the notification of the unstable behavior position information when it is determined that the unstable behavior position is in the discontinuous situation. Thus, it is possible to suppress an unnecessary notification of unstable behavior position information even when it cannot be said that the reproducibility of unstable behavior is high.

Alternatively, even if it is determined that the unstable behavior position is in the discontinuous situation, when the similarity determination unit 11e determines that the traveling state of the target vehicle 2 is similar to the traveling state in the unstable traveling data, the vehicle support unit 11g may notify the target vehicle 2 of the unstable behavior position information of the unstable behavior position determined to be in the discontinuous situation. Further, the vehicle support unit 11g may notify the target vehicle of the stable traveling data being the data on the previous traveling state of the target vehicle 2 that has not performed the unstable behavior at the unstable behavior position, together with the unstable behavior position information.

Alternatively, the vehicle support unit 11g may instruct (issue a stable traveling instruction) the target vehicle 2 to bring the traveling state of the target vehicle 2 close to the traveling state in the stable traveling data, instead of the notification of the stable traveling data. In this case, the information processing server 10 can suppress the occurrence of the unstable behavior at the unstable behavior position by bringing the traveling state of the target vehicle 2 close to the traveling state in the stable traveling data in response to the instruction.

When it is determined that the unstable behavior position is in the discontinuous situation, and the similarity determination unit 11e does not determine that the traveling state of the target vehicle 2 is similar to the traveling state in the unstable traveling data, the vehicle support unit 11g does not issue the notification of the unstable behavior position information. Thus, it is possible to suppress an unnecessary notification of unstable behavior position information even when it cannot be said that the reproducibility of unstable behavior is high.

In addition, regardless of whether the unstable behavior position is in the continuous occurrence situation or the discontinuous situation, when there is the target vehicle 2 heading toward the unstable behavior position, the vehicle support unit 11g may notify the target vehicle 2 of the unstable behavior position information being the information regarding the unstable behavior position.

Program

The program causes the processor 11 of the information processing server 10 described above to function (operate) as the target vehicle data recognition unit 11a, the unstable behavior position recognition unit 11b, the determination unit 11c, the traveling data acquisition unit 11d, the similarity determination unit 11e, the storage processing unit 11f, and the vehicle support unit 11g. The program is provided by a non-transitory recording medium such as a ROM or semiconductor memory. The program may also be provided via communication of a network or the like.

Processing Method of Information Processing Server

Figure 7:
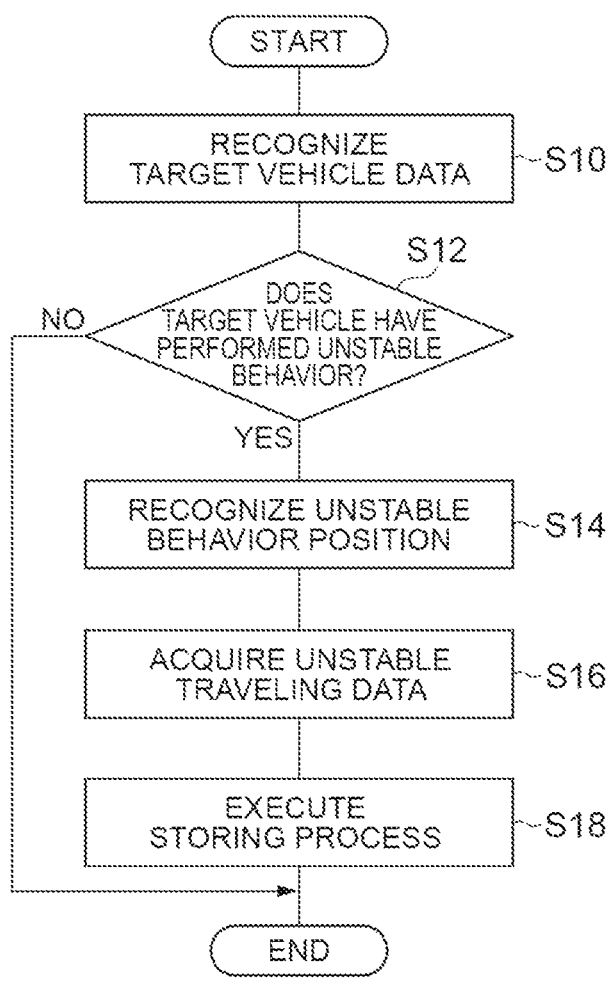
FIG. 7 is a flowchart illustrating an example of a storing process of unstable behavior position information.

Next, a processing method of the information processing server 10 according to the present embodiment will be described with reference to the drawings. FIG. 7 is a flowchart illustrating an example of a storing process of the unstable behavior position information. The storing process of the unstable behavior information may be executed every time the target vehicle data is transmitted from the target vehicle 2, or a batch process may be executed based on a plurality of pieces of target vehicle data at predetermined period intervals.

As illustrated in FIG. 7, in the information processing server 10, in S10, the target vehicle data recognition unit 11a recognizes the target vehicle data (target vehicle data recognition step). The target vehicle data recognition unit 11a recognizes the target vehicle data transmitted from the target vehicle 2. The target vehicle data includes the position information of the target vehicle 2 on the map and the traveling state of the target vehicle 2. Then, the information processing server 10 causes the process to transition to S12.

In S12, in the information processing server 10, the unstable behavior position recognition unit 11b determines whether or not the target vehicle 2 has performed an unstable behavior (unstable behavior determination step). The unstable behavior position recognition unit 11b determines whether or not the target vehicle 2 has performed the unstable behavior, based on the target vehicle data. The unstable behavior position recognition unit 11b determines whether or not the unstable behavior has occurred, for example, by determining, from the wheel speed of each wheel of the target vehicle 2, whether or not the target vehicle 2A has slipped as the unstable behavior. When it is not determined that the target vehicle 2 has performed the unstable behavior (S12: NO), the information processing server 10 ends a storing process of the unstable behavior position information this time. When it is determined that the target vehicle 2 has performed the unstable behavior (S12: YES), the information processing server 10 causes the process to transition to S14.

In S14, in the information processing server 10, the unstable behavior position recognition unit 11b recognizes the unstable behavior position (unstable behavior position recognition step). The unstable behavior position recognition unit 11b recognizes the unstable behavior position based on the position information of the target vehicle 2 on the map when the unstable behavior position recognition unit 11b has determined that the target vehicle 2 has performed the unstable behavior. Then, the information processing server 10 causes the process to transition to S16.

In S16, the information processing server 10 acquires unstable traveling data by the traveling data acquisition unit 11d (traveling data acquisition step). The traveling data acquisition unit 11d acquires the unstable traveling data regarding the traveling state of the target vehicle 2 in which the unstable behavior has occurred at the unstable behavior position, based on the target vehicle data recognized by the target vehicle data recognition unit 11a. Then, the information processing server 10 causes the process to transition to S18.

In S18, in the information processing server 10, the storage processing unit 11f performs a storing process of the unstable behavior position (storage processing step). The storage processing unit 11f stores the unstable behavior position recognized by the unstable behavior position recognition unit 11b and the unstable traveling data acquired by the traveling data acquisition unit 11d, in the storage database 15 in association with each other. Then, the information processing server 10 ends the storing process of the unstable behavior position information this time.

Figure 8:
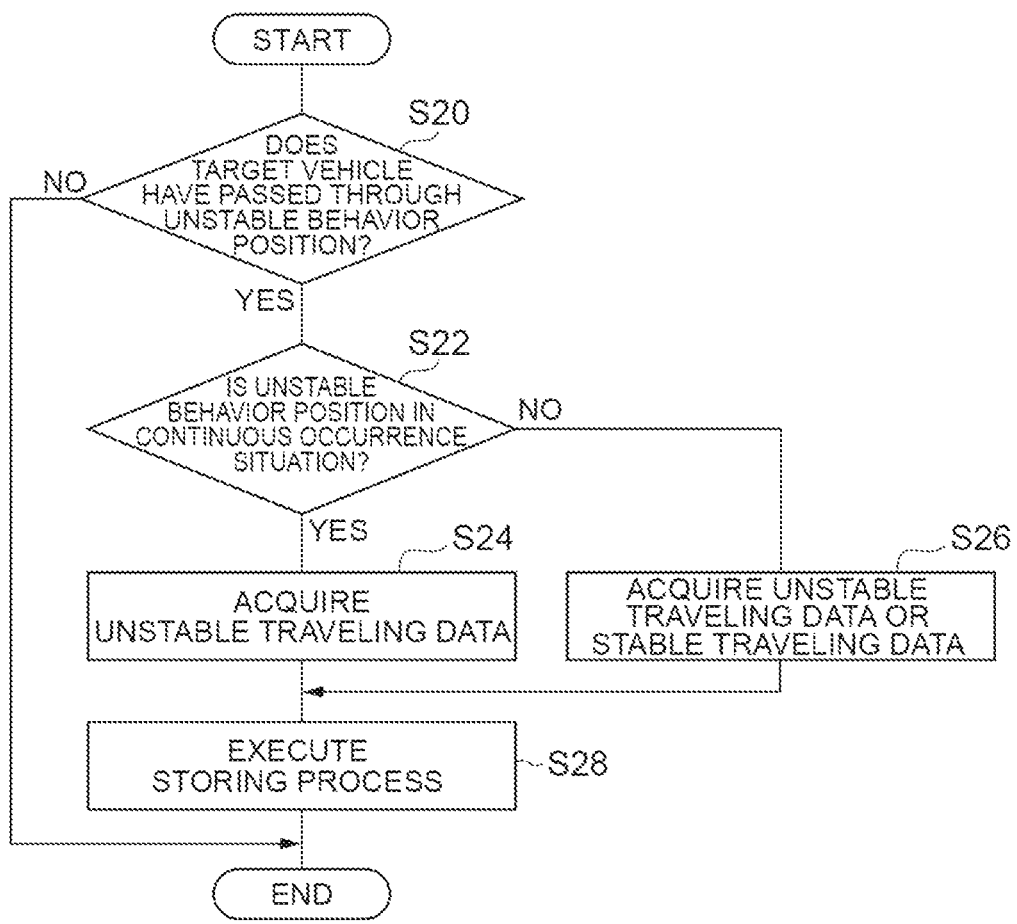
FIG. 8 is a flowchart illustrating an example of a continuous occurrence situation determination process.

FIG. 8 is a flowchart illustrating an example of a continuous occurrence situation determination process. The continuous occurrence situation determination process is executed, for example, when the unstable behavior position information is stored in the storage database 15.

As illustrated in FIG. 8, the determination unit 11c in the information processing server 10 determines whether or not the target vehicle 2 has passed through the unstable behavior position in S20 (unstable behavior position passage determination step). The determination unit 11c determines whether or not the target vehicle 2 has passed through the unstable behavior position, for example, based on the target vehicle data recognized by the target vehicle data recognition unit 11a and the unstable behavior position recognized by the unstable behavior position recognition unit 11b. When the determination unit 11c determines that the target vehicle 2 has passed through the unstable behavior position (S20: YES), the information processing server 10 causes the process to transition to S22. When the determination unit 11c does not determine that the target vehicle 2 has passed through the unstable behavior position (S20: NO), the information processing server 10 ends the continuous occurrence situation determination process this time.

In S22, the determination unit 11c in the information processing server 10 determines whether the unstable behavior position is in the continuous occurrence situation or the discontinuous situation (determination step). The determination unit 11c determines whether the unstable behavior position is in a continuous occurrence situation or a discontinuous situation, based on whether or not a plurality of target vehicles 2 have performed the unstable behavior at the unstable behavior position recognized by the unstable behavior position recognition unit 11b. When the determination unit 11c determines that the unstable behavior position is in the continuous occurrence situation (S22: YES), the information processing server 10 causes the process to transition to S24. When the determination unit 11c determines that the unstable behavior position is in the discontinuous situation (S22: NO), the information processing server 10 causes the process to transition to S28.

In S24, the traveling data acquisition unit 11d in the information processing server 10 acquires unstable traveling data (first traveling data acquisition step). The traveling data acquisition unit 11d acquires the unstable traveling data regarding the traveling state of the target vehicle 2 in which the unstable behavior has occurred at the unstable behavior position, based on the target vehicle data. Then, the information processing server 10 causes the process to transition to S28.

In S26, the traveling data acquisition unit 11d in the information processing server 10 acquires the unstable traveling data or stable traveling data (second traveling data acquisition step). Based on the target vehicle data, the traveling data acquisition unit 11d acquires the unstable traveling data regarding the traveling state of the target vehicle 2 in which the unstable behavior has occurred at the unstable behavior position or the stable traveling data regarding the traveling state of the target vehicle 2 that has passed through the unstable behavior position in the discontinuous situation without the unstable behavior occurring. Then, the information processing server 10 causes the process to transition to S28.

In S28, the storage processing unit 11f in the information processing server 10 executes a storing process (storage processing step). The storage processing unit 11f stores the unstable behavior position recognized by the unstable behavior position recognition unit 11b and the determination result of the determination unit 11c for the unstable behavior position, in the storage database 15 in association with each other. Further, the storage processing unit 11f stores the unstable behavior position, and the unstable traveling data or the stable traveling data in the storage database 15 in association with each other. Then, the information processing server 10 ends the continuous occurrence situation determination process this time.

FIG. 9 is a flowchart illustrating an example of a target vehicle support process. The target vehicle support process is executed when the target vehicle 2 as a support target is traveling.

As illustrated in FIG. 9, in S30, the vehicle support unit 11g in the information processing server 10 determines whether or not there is a target vehicle 2 heading toward the unstable behavior position in the continuous occurrence situation (first target vehicle determination step). The vehicle support unit 11g makes the above determination based on the target vehicle data recognized by the target vehicle data recognition unit 11a, the unstable behavior position recognized by the unstable behavior position recognition unit 11b, and the determination result of the determination unit 11c. When it is determined that there is the target vehicle 2 heading toward the unstable behavior position in the continuous occurrence situation (S30: YES), the information processing server 10 causes the process to transition to S32. When it is not determined that there is the target vehicle 2 heading toward the unstable behavior position in the continuous occurrence situation (S30: NO), the information processing server 10 causes the process to transition to S36.

In S32, the vehicle support unit 11g in the information processing server 10 notifies the target vehicle 2 of the unstable behavior position information (unstable behavior position information notification step). The vehicle support unit 11g notifies (provides) the target vehicle 2 of the unstable behavior position information via the communication unit 13. For example, the target vehicle 2 notifies the driver of the presence of the unstable behavior position by image display on a display or sound output of a speaker. Then, the information processing server 10 causes the process to transition to S34.

In S34, the vehicle support unit 11g in the information processing server 10 issues an instruction to change the traveling path or an instruction to cancel the autonomous driving (first instruction step).

For example, when the target vehicle 2 is in manual driving or autonomous driving, and a change of a traveling route (road) or a change of a path on a wide road makes it possible to avoid the unstable behavior position, the vehicle support unit 11g issues the instruction to change the traveling path. By avoiding the passage of the unstable behavior position, the target vehicle 2 can avoid performing of the unstable behavior.

When the target vehicle 2 is autonomously driving, and it is not possible to avoid the unstable behavior position by the change of the traveling path, the vehicle support unit 11g issues an instruction to cancel the autonomous driving. The target vehicle 2 can avoid performing of the unstable behavior at the unstable behavior position while the target vehicle 2 is still in autonomous driving. Then, the information processing server 10 ends the target vehicle support process this time.

In S36, the similarity determination unit 11e in the information processing server 10 determines whether or not there is the target vehicle 2 heading toward the unstable behavior position determined to be in the discontinuous situation (second target vehicle determination step). The similarity determination unit 11e determines whether or not there is the target vehicle 2 heading toward the unstable behavior position determined to be in the discontinuous situation, based on the target vehicle data recognized by the target vehicle data recognition unit 11a, the unstable behavior position recognized by the unstable behavior position recognition unit 11b, and the determination result of the determination unit 11c. When it is determined that there is the target vehicle 2 heading toward the unstable behavior position in the discontinuous situation (S36: YES), the information processing server 10 causes the process to transition to S38. When it is not determined that there is the target vehicle 2 heading toward the unstable behavior position in the discontinuous situation (S36: NO), the information processing server 10 ends the target vehicle support process this time.

In S38, the similarity determination unit 11e in the information processing server 10 determines whether or not the traveling state of the target vehicle 2 is similar to the traveling state in the unstable traveling data (similarity determination step). For example, when a state where a difference between the vehicle speed of the target vehicle 2 and the vehicle speed in the unstable traveling data is less than a similar vehicle speed threshold value, and a difference between the yaw rate of the target vehicle 2 and the yaw rate in the unstable traveling data is less than a similar yaw rate threshold value continues for a setting time (set in advance)

or longer, the similarity determination unit 11e determines that the traveling state of the target vehicle 2 is similar to the traveling state in the unstable traveling data. When the similarity determination unit 11e determines that the traveling state of the target vehicle 2 is similar to the traveling state in the unstable traveling data (S38: YES), the information processing server 10 causes the process to transition to S40. When the similarity determination unit 11e does not determine that the traveling state of the target vehicle 2 is similar to the traveling state in the unstable traveling data (S38: NO), the information processing server 10 ends the target vehicle support process this time.

In S40, the vehicle support unit 11g in the information processing server 10 notifies the target vehicle 2 of the unstable behavior position information (unstable behavior position information notification step). Then, the information processing server 10 causes the process to transition to S42.

In S42, the vehicle support unit 11g in the information processing server 10 issues a notification of the stable traveling data or a stable traveling instruction of (second instruction step). For example, when the target vehicle 2 is autonomously driving, the vehicle support unit 11g performs a notification of the stable traveling data being the data on the previous traveling state of the target vehicle 2 that has not performed the unstable behavior at the unstable behavior position. In this case, the target vehicle 2 can perform autonomous driving so that the target vehicle 2 passes through the unstable behavior position in accordance with the stable traveling data.

On the other hand, for example, when the target vehicle is manually driving, the vehicle support unit 11g issues a stable traveling instruction so that the traveling state of the target vehicle 2 is brought close to the traveling state in the stable traveling data. The target vehicle 2 suppresses the occurrence of the unstable behavior at the unstable behavior position by, for example, performing a driving support for controlling the traveling state of the target vehicle 2 in accordance with the stable traveling data. The vehicle support unit 11g may issue the notification of the stable traveling data or issue the stable traveling instruction, regardless of whether the target vehicle 2 is in autonomous driving or manual driving. Then, the information processing server 10 ends the target vehicle support process this time.

According to the information processing server 10 (and the processing method of the information processing server 10) according to the present embodiment described above, the unstable behavior position at which the target vehicle 2 has performed the unstable behavior is recognized from the target vehicle data, and it is determined whether the unstable behavior position is in the continuous occurrence situation or the discontinuous situation. In addition, the determination result is stored in the storage database 15 in association with the unstable behavior information at the unstable behavior position. Thus, according to the information processing server 10, it is possible to store the unstable behavior position and the determination result of whether the unstable behavior position is in the continuous occurrence situation or the discontinuous situation, in association with each other.

Further, according to the information processing server 10, when it is determined that the unstable behavior position is in the continuous occurrence situation, it is possible to avoid the occurrence of the unstable behavior in the target vehicle 2 at the unstable behavior position by instructing the target vehicle 2 to change the traveling path for avoiding the unstable behavior position.

Further, according to the information processing server 10, when it is determined that the unstable behavior position is in the continuous occurrence situation, it is possible to avoid an occurrence of a situation in which the target vehicle 2 performs the unstable behavior at the unstable behavior position, while autonomous driving, by issuing an instruction to cancel autonomous driving at the unstable behavior position along with the notification of the unstable behavior position information.

Further, according to the information processing server 10, when it is determined that the unstable behavior position is in the discontinuous situation, by not issuing the notification of the unstable behavior position information, it is possible to suppress the unnecessary notification of the unstable behavior position information even when it cannot be said that the reproducibility of the unstable behavior is high.

Further, according to the information processing server 10, when it is determined that the traveling state of the target vehicle 2 is similar to the traveling state in the unstable traveling data, it is possible to suppress the occurrence of the unstable behavior in the target vehicle 2 by notifying the target vehicle 2 of the unstable behavior position information of the unstable behavior position determined to be in the discontinuous situation.

Further, according to the information processing server 10, when there is the target vehicle 2 heading toward the unstable behavior position determined to be in the discontinuous situation, it is possible to suppress the occurrence of the unstable behavior in the target vehicle 2 at the unstable behavior position by notifying the target vehicle 2 of the stable traveling data and the unstable behavior position information being the information regarding the unstable behavior position.

Further, according to the information processing server 10, when it is determined that the traveling state of the target vehicle 2 is similar to the traveling state in the unstable traveling data, it is possible to suppress the occurrence of the unstable behavior in the target vehicle 2 at the unstable behavior position by notifying the target vehicle 2 of the unstable behavior position information of the unstable behavior position determined to be in the discontinuous situation and issuing an instruction to bring the traveling state of the target vehicle 2 close to the traveling state in the stable traveling data.

Hitherto, the embodiment of the present disclosure has been described above, but the present disclosure is not limited to the above-described embodiment. The present disclosure can be carried out in various forms having various changes and improvements based on the knowledge of those skilled in the art, including the above-described embodiment.

The traveling data acquisition unit 11d in the information processing server 10 does not necessarily have to acquire both the stable traveling data and the unstable traveling data. The traveling data acquisition unit 11d may acquire only one of the stable traveling data and the unstable traveling data. The storage processing unit 11f does not need the storing process of data that is not acquired.

When the stable traveling data is not acquired, the driving control support is not performed based on the notification of the stable traveling data to the target vehicle 2 and the stable traveling data for the target vehicle 2. When the unstable traveling data is not acquired, the similarity determination unit 11e does not perform the similarity determination. In this case, the information processing server 10 does not need to include the similarity determination unit 11e. Further, the information processing server 10 may be configured to acquire neither the stable traveling data nor the unstable traveling data and not to include the traveling data acquisition unit 11*d*.

Regardless of whether the unstable behavior position is in the continuous occurrence situation or the discontinuous situation, when there is the target vehicle 2 heading toward the unstable behavior position, the vehicle support unit 11*g* may notify the target vehicle 2 of the unstable behavior position information being the information regarding the unstable behavior position.

What is claimed is:

1. An information processing server comprising a processor configured to:
   recognize target vehicle data including a traveling state of a first target vehicle and position information of the first target vehicle on a map;
   recognize an unstable behavior position which is a position on the map, at which at least one the first target vehicle has performed an unstable behavior, based on the target vehicle data;
   determine whether the unstable behavior position is in a continuous occurrence situation or a discontinuous situation, based on whether or not a plurality of vehicles other than the first target vehicle have performed the unstable behavior at the unstable behavior position;
   store a determination result in a storage database in association with the unstable behavior position;
   notify the first target vehicle of unstable behavior position information being information regarding the unstable behavior position, when there is the first target vehicle heading toward the unstable behavior position;
   acquire unstable traveling data regarding the traveling state of the first target vehicle in which the unstable behavior has occurred at the unstable behavior position determined to be in the discontinuous situation, and stable traveling data regarding the traveling state of the first target vehicle in which the unstable behavior has not occurred at the unstable behavior position determined to be in the discontinuous situation;
   when there is the first target vehicle heading toward the unstable behavior position determined to be in the discontinuous situation, determine whether or not the traveling state of the first target vehicle is similar to a traveling state in the unstable traveling data; and
   control, in response to the determination result, traveling of the first target vehicle via a drive actuator, a brake actuator, and a steering actuator, the first target vehicle is an autonomous driving vehicle,
   wherein the processor is configured to, when it is determined that the unstable behavior position is in the continuous occurrence situation, instruct the first target vehicle to change a traveling path such that the first target vehicle avoids the unstable behavior position, and
   wherein the processor is configured to, when the processor determines that the traveling state of the first target vehicle is similar to the traveling state in the unstable traveling data, notify the first target vehicle of the unstable behavior position information of the unstable behavior position determined to be in the discontinuous situation and issue an instruction to bring the traveling state of the first target vehicle closer to the traveling state in the stable traveling data.

2. The information processing server according to claim 1, wherein the processor is configured to further comprising:
   when it is determined that the unstable behavior position is in the continuous occurrence situation, issue an instruction to cancel autonomous driving at the unstable behavior position along with the notification of the unstable behavior position information.

3. The information processing server according to claim 2, wherein the processor is configured to further comprising:
   when it is determined that the unstable behavior position is in the continuous occurrence situation, issue the notification of the unstable behavior position information, and when it is determined that the unstable behavior position is in the discontinuous situation, not issue the notification of the unstable behavior position information.

4. The information processing server according to claim 2, wherein the processor is configured to further comprising:
   when there is the first target vehicle heading toward the unstable behavior position determined to be in the discontinuous situation, notify the first target vehicle of the stable traveling data and the unstable behavior position information being information regarding the unstable behavior position.

5. The information processing server according to claim 1, wherein the processor is configured to:
   when it is determined that the unstable behavior position is in the continuous occurrence situation, issue the notification of the unstable behavior position information, and when it is determined that the unstable behavior position is in the discontinuous situation, not issue the notification of the unstable behavior position information.

6. The information processing server according to claim 1, wherein the processor is configured to:
   when there is the first target vehicle heading toward the unstable behavior position determined to be in the discontinuous situation, notify the first target vehicle of the stable traveling data and the unstable behavior position information being information regarding the unstable behavior position.

7. A processing method of an information processing server, the method comprising:
   recognizing target vehicle data including a traveling state of a first target vehicle and position information of the first target vehicle on a map;
   recognizing an unstable behavior position which is a position on the map, at which the first target vehicle has performed an unstable behavior, based on the target vehicle data;
   determining whether the unstable behavior position is in a continuous occurrence situation or a discontinuous situation, based on whether or not a plurality of vehicles other than the first target vehicle have performed the unstable behavior at the unstable behavior position;
   storing a determination result in the step of determining, in a storage database in association with the unstable behavior position;
   notifying the first target vehicle of unstable behavior position information being information regarding the unstable behavior position, when there is the first target vehicle heading toward the unstable behavior position;
   acquiring unstable traveling data regarding the traveling state of the first target vehicle in which the unstable behavior has occurred at the unstable behavior position determined to be in the discontinuous situation, and stable traveling data regarding the traveling state of the first target vehicle in which the unstable behavior has not occurred at the unstable behavior position determined to be in the discontinuous situation;

when there is the first target vehicle heading toward the unstable behavior position determined to be in the discontinuous situation, determining whether or not the traveling state of the first target vehicle is similar to a traveling state in the unstable traveling data; and controlling, in response to the determination result, traveling of the first target vehicle via a drive actuator, a brake actuator, and a steering actuator, the first target vehicle is an autonomous driving vehicle, wherein the method further comprises, when it is determined that the unstable behavior position is in the continuous occurrence situation, instructing the first target vehicle to change a traveling path such that the first target vehicle avoids the unstable behavior position, and wherein the method further comprises, when the processor determines that the traveling state of the first target vehicle is similar to the traveling state in the unstable traveling data, notifying the first target vehicle of the unstable behavior position information of the unstable behavior position determined to be in the discontinuous situation and issue an instruction to bring the traveling state of the first target vehicle closer to the traveling state in the stable traveling data.

8. A non-transitory computer-readable storage media stored a program causing a computer to function as an information processing server, the information processing server comprising a processor configured to:

recognize target vehicle data including a traveling state of a first target vehicle and position information of the first target vehicle on a map;

recognize an unstable behavior position which is a position on the map, at which at least one the first target vehicle has performed an unstable behavior, based on the target vehicle data;

determine whether the unstable behavior position is in a continuous occurrence situation or a discontinuous situation, based on whether or not a plurality of vehicles other than the first target vehicle have performed the unstable behavior at the unstable behavior position;

store a determination result of the determination unit, in a storage database in association with the unstable behavior position;

notify the first target vehicle of unstable behavior position information being information regarding the unstable behavior position, when there is the first target vehicle heading toward the unstable behavior position;

acquire unstable traveling data regarding the traveling state of the first target vehicle in which the unstable behavior has occurred at the unstable behavior position determined to be in the discontinuous situation, and stable traveling data regarding the traveling state of the first target vehicle in which the unstable behavior has not occurred at the unstable behavior position determined to be in the discontinuous situation;

when there is the first target vehicle heading toward the unstable behavior position determined to be in the discontinuous situation, determine whether or not the traveling state of the first target vehicle is similar to a traveling state in the unstable traveling data; and control, in response to the determination result, traveling of the first target vehicle via a drive actuator, a brake actuator, and a steering actuator, the first target vehicle is an autonomous driving vehicle, when it is determined that the unstable behavior position is in the continuous occurrence situation, instruct the first target vehicle to change a traveling path such that the first target vehicle avoids the unstable behavior position, and when the processor determines that the traveling state of the first target vehicle is similar to the traveling state in the unstable traveling data, notify the first target vehicle of the unstable behavior position information of the unstable behavior position determined to be in the discontinuous situation and issue an instruction to bring the traveling state of the first target vehicle closer to the traveling state in the stable traveling data.

* * * * *